US012592795B2

(12) United States Patent
Tsai et al.

(10) Patent No.: US 12,592,795 B2
(45) Date of Patent: Mar. 31, 2026

(54) METHOD AND USER EQUIPMENT FOR HYBRID AUTOMATIC REPEAT REQUEST MODE OPERATION IN NON-TERRESTRIAL NETWORK

(71) Applicant: SHARP KABUSHIKI KAISHA, Sakai City (JP)

(72) Inventors: Hsin-Hsi Tsai, Taipei (TW); Chien-Chun Cheng, Taipei (TW); Yung-Lan Tseng, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 483 days.

(21) Appl. No.: 17/704,396

(22) Filed: Mar. 25, 2022

(65) Prior Publication Data

US 2022/0311558 A1     Sep. 29, 2022

Related U.S. Application Data

(60) Provisional application No. 63/166,913, filed on Mar. 26, 2021, provisional application No. 63/166,903, filed on Mar. 26, 2021.

(51) Int. Cl.
*H04L 1/1829*     (2023.01)
*H04L 1/1607*     (2023.01)
(Continued)

(52) U.S. Cl.
CPC .......... *H04L 1/1861* (2013.01); *H04L 1/1614* (2013.01); *H04L 1/1812* (2013.01); *H04L 1/1822* (2013.01); *H04L 1/1854* (2013.01)

(58) Field of Classification Search
CPC ..................................................... H04L 1/1614
See application file for complete search history.

(56) References Cited

U.S. PATENT DOCUMENTS 11,929,831 B2 *   3/2024   Shrestha ............... H04W 72/23
2018/0014298 A1   1/2018   Sun et al.
(Continued)

FOREIGN PATENT DOCUMENTS

CN     110419257     11/2019
CN     111436130     7/2020
WO     2020205728     10/2020

OTHER PUBLICATIONS

Davies, Gordon, Networking Fundamentals, (Packt Publishing: Dec. 2019), exemplary portions only, retrieved from https://learning. oreilly.com/library/view/-/9781838643508/ (Year: 2019).*
(Continued)

*Primary Examiner* — Ayaz R Sheikh
*Assistant Examiner* — Christopher R Davis
(74) *Attorney, Agent, or Firm* — ScienBiziP, P.C.

(57) ABSTRACT

A method and a user equipment for performing a Hybrid Automatic Repeat Request (HARQ) operation are provided. The method includes: receiving, from a Base Station (BS), a first configuration for a serving cell, the first configuration including a first bitmap for indicating a HARQ mode of each HARQ process in a first HARQ process set, each bit in the first bitmap being associated with a corresponding HARQ process in the first HARQ process set; and identify, based on the first bitmap, whether each HARQ process in the first HARQ process set is related to a first HARQ mode or a second HARQ mode.

14 Claims, 5 Drawing Sheets

(51) Int. Cl.
H04L 1/1812 (2023.01)
H04L 1/1822 (2023.01)

(56) References Cited

U.S. PATENT DOCUMENTS

| | | | |
|---|---|---|---|
| 2020/0014495 A1 | 1/2020 | Niu et al. | |
| 2022/0086811 A1 | 3/2022 | Han et al. | |
| 2023/0239820 A1* | 7/2023 | Han | H04B 7/1851 |
| | | | 370/350 |
| 2023/0319822 A1* | 10/2023 | Park | H04W 72/232 |
| | | | 370/329 |
| 2023/0422275 A1* | 12/2023 | Kim | H04L 5/0055 |

OTHER PUBLICATIONS

Wikipedia, Placeholder Name, Computing (Feb. 20, 2021) retrieved from The Way Back Machine https://web.archive.org/web/20210220000832/https://en.wikipedia.org/wiki/Placeholder_name (Year: 2021).*

3GPP TS 37.213, "3rd Generation Partnership Project; Technical Specification Group Radio Access Network; Physical layer procedures for shared spectrum channel access (Release 16)", V16.4.0 (Dec. 2020).

3GPP TS 38.211, "3rd Generation Partnership Project; Technical Specification Group Radio Access Network; NR; Physical channels and modulation (Release 16)", V16.5.0 (Mar. 2021).

3GPP TS 38.300, "3rd Generation Partnership Project; Technical Specification Group Radio Access Network; NR; NR and NG-RAN Overall Description; Stage 2 (Release 16)", V16.4.0 (Dec. 2020).

3GPP TS 38.321, "3rd Generation Partnership Project; Technical Specification Group Radio Access Network; NR; Medium Access Control (MAC) protocol specification (Release 16)", V16.3.0 (Dec. 2020).

3GPP TS 38.322, "3rd Generation Partnership Project; Technical Specification Group Radio Access Network; NR; Radio Link Control (RLC) protocol specification (Release 16)", V16.2.0 (Dec. 2020).

3GPP TS 38.323, "3rd Generation Partnership Project; Technical Specification Group Radio Access Network; NR; Packet Data Convergence Protocol (PDCP) specification (Release 16)", V16.2.0 (Sep. 2020).

3GPP TS 38.212, "3rd Generation Partnership Project; Technical Specification Group Radio Access Network; NR; Multiplexing and channel coding (Release 16)", V16.3.0 (Sep. 2020).

3GPP TS 38.213, "3rd Generation Partnership Project; Technical Specification Group Radio Access Network; NR; Physical layer procedures for control (Release 16)", V16.4.0 (Dec. 2020).

3GPP TS 38.214, "3rd Generation Partnership Project; Technical Specification Group Radio Access Network; NR; Physical layer procedures for data (Release 16)", V16.4.0 (Dec. 2020).

3GPP TS 38.331, "3rd Generation Partnership Project; Technical Specification Group Radio Access Network; NR; Radio Resource Control (RRC) protocol specification (Release 16)", V16.3.1 (Jan. 2021).

3GPP TS 38.473, "3rd Generation Partnership Project; Technical Specification Group Radio Access Network; NG-RAN; F1 application protocol (F1AP) (Release 16)", V16.4.0 (Jan. 2021).

3GPP TR 38.821, "3rd Generation Partnership Project; Technical Specification Group Radio Access Network; Solutions for NR to support non-terrestrial networks (NTN) (Release 16)", V16.0.0 (Dec. 2019).

* cited by examiner

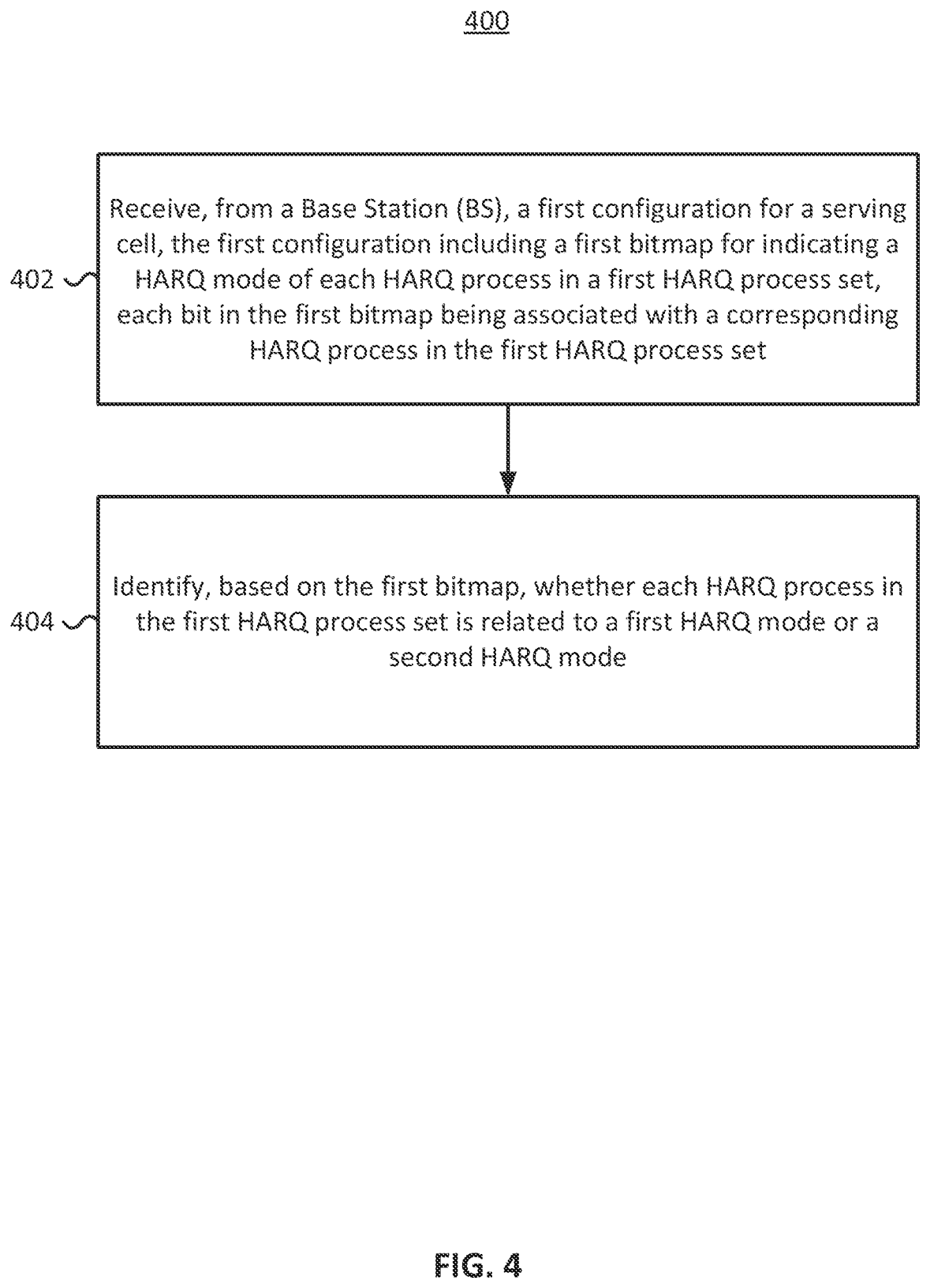

400

```
┌──────────────────────────────────────────────────────────────────┐
│                                                                    │
│        Receive, from a Base Station (BS), a first configuration     │
│        for a serving cell, the first configuration including a      │
│  402   first bitmap for indicating a HARQ mode of each HARQ         │
│        process in a first HARQ process set, each bit in the first   │
│        bitmap being associated with a corresponding HARQ           │
│        process in the first HARQ process set                        │
│                                                                    │
└──────────────────────────────────────────────────────────────────┘
                                  │
                                  ▼
┌──────────────────────────────────────────────────────────────────┐
│                                                                    │
│                                                                    │
│        Identify, based on the first bitmap, whether each HARQ       │
│  404   process in the first HARQ process set is related to a first  │
│        HARQ mode or a second HARQ mode                              │
│                                                                    │
│                                                                    │
└──────────────────────────────────────────────────────────────────┘
```

FIG. 4

METHOD AND USER EQUIPMENT FOR HYBRID AUTOMATIC REPEAT REQUEST MODE OPERATION IN NON-TERRESTRIAL NETWORK

CROSS-REFERENCE TO RELATED APPLICATION(S)

The present disclosure claims the benefit of and priority to U.S. Provisional Patent Application Ser. No. 63/166,903, filed on Mar. 26, 2021, entitled "UL HARQ RETRANS-MISSION SCHEME IN NTN" ("the '903 provisional") and U.S. Provisional Patent Application Ser. No. 63/166,913, filed on Mar. 26, 2021, entitled "DL SCHEDULING IN NTN" ("the '913 provisional"). The contents of the '903 provisional and the '913 provisional are hereby incorporated fully by reference into the present disclosure for all purposes.

FIELD

The present disclosure is related to wireless communication and, more particularly, to a method and a user equipment (UE) for performing a hybrid automatic repeat request (HARQ) operation in next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for performing a hybrid automatic repeat request (HARQ) feedback operation in next generation wireless communication networks.

In a first aspect of the present disclosure, a method for a user equipment (UE) for performing a HARQ operation is provided. The method includes: receiving, from a Base Station (BS), a first configuration for a serving cell, the first configuration including a first bitmap for indicating an HARQ mode of each HARQ process in a first HARQ process set, each bit in the first bitmap being associated with a corresponding HARQ process in the first HARQ process set; and identifying, based on the first bitmap, whether each HARQ process in the first HARQ process set is related to a first HARQ mode or a second HARQ mode.

In an implementation of the first aspect of the present disclosure, the first HARQ mode is denoted as HARQ Mode A and the second HARQ mode is denoted as HARQ Mode B.

In an implementation of the first aspect of the present disclosure, the first configuration is included in a Physical Uplink Shared Channel (PUSCH) configuration for the serving cell.

In an implementation of the first aspect of the present disclosure, the method further includes: receiving, from the BS, a logical channel configuration including a parameter, the parameter indicating that at least one of the first HARQ mode and the second HARQ mode are allowed to be mapped to a logical channel.

In an implementation of the first aspect of the present disclosure, the method further includes: receiving, from the BS, an uplink (UL) grant indicating a first HARQ process in the first HARQ process set; performing, based on a Logical Channel Prioritization (LCP) procedure, a transmission for the first HARQ process via the UL grant; and determining, based on the parameter and the HARQ mode of the first HARQ process, whether the logical channel is allowed to be selected for the transmission.

In an implementation of the first aspect of the present disclosure, the method further includes: setting a value of a timer for a first HARQ process in the first HARQ process set in a case that the first HARQ process is related to the first HARQ mode, wherein: the value is a sum of a first value and a second value, the first value is configured by a Discontinuous Reception (DRX) configuration received from the BS, the second value corresponds to a Round Trip Time (RTT), and the RTT is derived by a Timing Advance (TA) value and a scheduling offset.

In an implementation of the first aspect of the present disclosure, the method further includes: identifying, based on a bit in the first bitmap, that a first HARQ process in the first HARQ process set is related to the first HARQ mode in a case that the bit indicates a first value; identifying, based on the bit in the first bitmap, that the first HARQ process in the first HARQ process set is related to the second HARQ mode in a case that the bit indicates a second value; and ignoring the bit in the first bitmap in a case that the bit is not configured with a value.

In an implementation of the first aspect of the present disclosure, receiving, from the BS, a second configuration for the serving cell, the second configuration including a second bitmap for indicating a Downlink (DL) HARQ feedback condition of each HARQ process in a second HARQ process set, each bit in the second bitmap being associated with a corresponding HARQ process in the second HARQ process set; and identifying, based on the second bitmap, whether each HARQ process in the second HARQ process set is related to a first DL HARQ feedback condition or a second DL HARQ feedback condition.

In an implementation of the first aspect of the present disclosure, the first DL HARQ feedback condition is denoted as HARQ feedback for a HARQ process in the second HARQ process set being enabled and the second DL HARQ feedback condition is denoted as the HARQ feedback for the HARQ process in the second HARQ process set being disabled.

In an implementation of the first aspect of the present disclosure, the second configuration is included in a Physical Downlink Shared Channel (PDSCH) configuration for the serving cell.

In a second aspect of the present disclosure, a UE for performing a HARQ operation is provided. The UE includes one or more non-transitory computer-readable media having computer-executable instructions embodied thereon; and at least one processor coupled to the one or more non-transitory computer-readable media. The at least one processor is configured to execute the computer-executable instructions to cause the UE to: receive, from a Base Station (BS), a first configuration for a serving cell, the first configuration including a first bitmap for indicating a HARQ mode of each HARQ process in a first HARQ process set, each bit in the first bitmap being associated with a corresponding HARQ process in the first HARQ process set; and identify, based on the first bitmap, whether each HARQ process in the first HARQ process set is related to a first HARQ mode or a second HARQ mode.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

FIG. 4 is a flowchart illustrating a method for a UE for performing a hybrid automatic repeat request (HARQ) operation, according to an example implementation of the present disclosure.

DESCRIPTION

Figure 1:
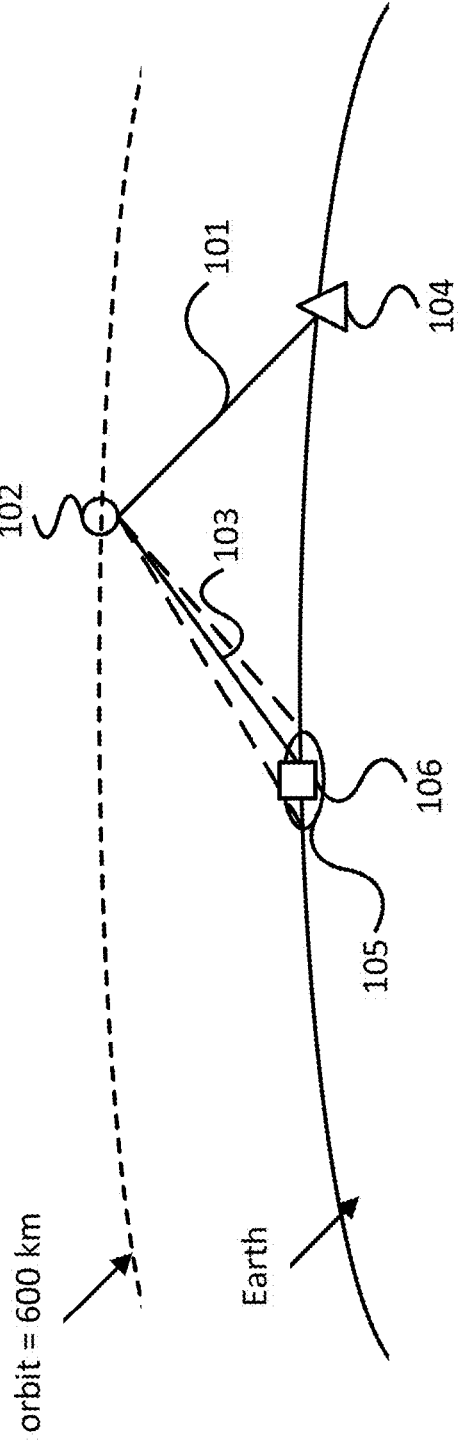
FIG. 1 is a schematic diagram illustrating a Low Earth Orbit (LEO) satellite with transparent-payload deployment, according to an example implementation of the present disclosure.

The acronyms in the present application are defined as follows and unless otherwise specified, the acronyms have the following meanings:

| Acronym | Full name |
| --- | --- |
| 3GPP | 3$^{rd}$ Generation Partnership Project |
| 5GC | 5G Core |
| ACK | Acknowledgement |
| ASIC | Application Specific Integrated Circuitry |
| ATG | Air-To-Ground |
| BDS | Beidou Navigation Satellite System |
| BLER | Block Error Rate |
| BS | Base Station |
| BSC | BS Controller |
| BSD | Buffer Size Duration |
| BWP | Bandwidth Part |
| CA | Carrier Aggregation |
| CBRA | Contention-Based Random Access |
| CCCH | Common Control Channel |
| CD-ROM | Compact Disc Read-Only Memory |
| CE | Control Element |
| CFRA | Contention Free Random Access |
| CG | Configured Grant |
| CN | Core Network |
| CP | Cyclic Prefix |
| CRC | Cyclic Redundancy Check |
| CRID | Contention Resolution Identity |
| C-RNTI | Cell-Radio Network Temporary Identifier |
| CI-RNTI | Cancellation Indication-RNTI |
| CS-RNTI | Configured Scheduling-RNTI |
| CSI | Channel State Information |
| dB | Decibel |
| DC | Dual Connectivity |
| DCI | Downlink Control Information |
| DFI | Downlink Feedback Information |

-continued

| Acronym | Full name |
| --- | --- |
| DL | Downlink |
| DL-SCH | Downlink-Shared Channel |
| DMRS | Demodulation Reference Signal |
| DRX | Discontinuous Reception |
| DSP | Digital Signal Processor |
| e-LTE | evolved LTE |
| E-UTRA | Evolved Universal Terrestrial Radio Access |
| E-UTRAN | Evolved Universal Terrestrial Radio Access Network |
| EDGE | Enhanced Data rates for GSM Evolution |
| EEPROM | Electrically Erasable Programmable Read-Only Memory |
| eMBB | enhanced Mobile Broadband |
| eMTC | massive Machine-Type Communication |
| EPC | Evolved Packet Core |
| EPROM | Erasable Programmable Read-Only Memory |
| GEO | Geostationary Earth Orbit |
| GERAN | EDGE RAN |
| GLONASS | Global Navigation Satellite System |
| gNB | Next Generation Node B |
| GNSS | Global Navigation Satellite System |
| GPRS | General Packet Radio Service |
| GPS | Global Positioning System |
| GSM | Global System for Mobile communication |
| HAPS | High Altitude Platform Station |
| HARQ | Hybrid Automatic Repeat request |
| HSPA | High-Speed Packet Access |
| ID | Identifier |
| IE | Information Element |
| LCH | Logical Channel |
| LCP | Logical Channel Prioritization |
| LDPC | Low-Density Parity-Check |
| LEO | Low Earth Orbit |
| LTE | Long-Term Evolution |
| LTE-A | LTE-Advanced |
| MAC | Medium Access Control |
| MCG | Master Cell Group |
| MEO | Medium Earth Orbit |
| Msg | Message |
| NACK | Non-Acknowledgement |
| NAS | Non-Access Stratum |
| NDI | New Data Indicator |
| NGEO | Non-Geostationary Earth Orbit |
| NGSO | Non-Geosynchronous Orbit |
| NR | New Radio |
| NTN | Non-Terrestrial Network |
| NW | Network |
| OFDM | Orthogonal Frequency-Division Multiplexing |
| PBR | Prioritized Bit Rate |
| PCell | Primacy Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PRACH | Physical Random Access Channel |
| PRB | Physical Resource Block |
| PRU | PUSCH Resource Unit |
| ProSe | Proximity Service |
| PSCell | Primary SCG Cell |
| PUCCH | Physical Uplink Control Channel |
| PUSCH | Physical Uplink Shared Channel |
| PO | PUSCH Occasion |
| QoS | Quality of Service |
| RA | Random Access |
| RACH | Random Access Channel |
| RAM | Random Access Memory |
| RAN | Radio Access Network |
| RAR | Random Access Response |
| RAT | Radio Access Technology |
| Rel | Release |
| RLC | Radio Link Control |
| RNC | Radio Network Controller |
| RNTI | Radio Network Temporary Identifier |
| RO | PRACH Occasion |
| ROM | Read Only Memory |
| RRC | Radio Resource Control |
| RSRP | Reference Signal Received Power |
| RTT | Round Trip Time |

-continued

| Acronym | Full name |
|---------|-----------|
| RV | Redundancy Version |
| SCell | Secondary Cell |
| SCG | Secondary Cell Group |
| SDAP | Service Data Adaptation Protocol |
| SDU | Service Data Unit |
| SFN | System Frame Number |
| SI | System Information |
| SL | Sidelink |
| SL-SCH | Sidelink-Shared Channel |
| SN | Sequence Number |
| SpCell | Special Cell |
| SPS | Semi-Persistent Scheduling |
| SRS | Sounding Reference Signal |
| SS | Search Space |
| SSB | SS/PBCH Block |
| SUL | Supplementary Uplink |
| TA | Timing Advance |
| TAG | Timing Advance Group |
| TB | Transport Block |
| TBS | Transport Block Size |
| TC-RNTI | Temporary C-RNTI |
| TPC | Transmit Power Control |
| TR | Technical Report |
| TS | Technical Specification |
| Tx | Transmission |
| TRP | Transmission and Reception Point |
| UE | User Equipment |
| UL | Uplink |
| UL-SCH | Uplink-Shared Channel |
| UMTS | Universal Mobile Telecommunications System |
| URLLC | Ultra-Reliable and Low-Latency Communication |
| V2X | Vehicle to Everything |
| W-CDMA | Wideband-Code Division Multiple Access |
| WiMAX | Microwave Access |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

Earth-centered, Earth-fixed: A global geodetic reference system for the Earth intended for practical applications of mapping, charting, geo-positioning, and navigation, as specified in TR 8350.2.

Feeder link: The wireless link between the NTN Gateway and the NTN payload.

Geosynchronous Orbit: Earth-centered orbit at approximately 35786 kilometers above Earth's surface and synchronized with Earth's rotation. A geostationary orbit may be a non-inclined geosynchronous orbit (e.g., in the Earth's equator plane).

Non-terrestrial network (NTN): An NG-RAN consisting of gNBs which provide non-terrestrial NR access to UEs by means of an NTN payload carried on an airborne or spaceborne NTN vehicle and an NTN Gateway.

NTN Gateway: An earth station located at the surface of the Earth providing connectivity to the NTN payload using the feeder link. An NTN Gateway may be a Transport Network Layer (TNL) node.

NTN payload: A network node carried onboard a satellite or high-altitude platform station, providing connectivity functions between the service link and the feeder link. The NTN payload may be a TNL node.

Satellite: A space-borne vehicle orbiting the Earth and carrying the NTN payload.

Service link: The wireless link between the NTN payload and UE.

User Equipment (UE): The UE may be referred to as PHY/MAC/RLC/PDCP/SDAP/RRC entity/layer. The PHY/MAC/RLC/PDCP/SDAP/RRC entity/layer may be referred to as the UE.

Network (NW): The NW may be a network node, a TRP, a cell (e.g., SpCell, PCell, PSCell, and/or SCell), an eNB, a gNB, and/or a base station.

Serving Cell: The serving cell may be a PCell, a PSCell, or an SCell. The serving cell may be an activated or a deactivated serving cell.

Special Cell (SpCell): For Dual Connectivity operation, the term Special Cell may refer to the PCell of the MCG or the PSCell of the SCG depending on if the MAC entity is associated to the MCG or the SCG, respectively. Otherwise, the term Special Cell may refer to the PCell.

Dynamic scheduling: The gNB may dynamically allocate resources to the UEs via the C-RNTI on a PDCCH.

UL grant: The uplink grant may be either received dynamically on the PDCCH, in a RAR, configured semi-persistently by RRC or determined to be associated with the PUSCH resource of MsgA. The MAC entity may have an uplink grant to transmit on the UL-SCH. To perform the requested transmissions, the MAC layer may receive HARQ information from lower layers.

Semi-Persistent Scheduling (SPS): The SPS may be configured by RRC for a serving cell per BWP. Multiple assignments may be active simultaneously in the same BWP. The activation and deactivation of the DL SPS may be independent among the serving cells. For the DL SPS, a DL assignment may be provided by a PDCCH, and stored or cleared based on L1 signaling indicating SPS activation or deactivation.

Configured Grant (CG): The gNB may allocate uplink resources for the initial HARQ transmissions and the HARQ retransmissions to the UEs. Two types of configured uplink grants may be defined. With Type 1, RRC may directly provide the configured uplink grant (including the periodicity). With Type 2, RRC may define the periodicity of the configured uplink grant while a PDCCH addressed to CS-RNTI can either signal and activate the configured uplink grant, or deactivate it (e.g., a PDCCH addressed to CS-RNTI may indicate that the uplink grant can be implicitly reused according to the periodicity defined by RRC, until deactivated).

Random Access Response (RAR) grant: The UL grant provided via Msg2/RAR and/or MsgB of the 4-step/2-step RA procedure. The UL grant may be included in a MAC payload for RAR and/or MsgB (e.g., MAC RAR and/or fallback RAR). The UL grant may be provided by an Uplink Grant field indicating the resources to be used on the uplink in 3GPP TS 38.213. The size of the UL Grant field may be 27 bits. The transmission for the RAR grant may be via Msg 3.

MsgA: The MsgA may consist of a PRACH preamble and a PUSCH transmission, known as MsgA PRACH and MsgA PUSCH, respectively.

MsgA PRACH: The MsgA PRACH preambles may be separated from the 4-step RACH preambles but can be transmitted in the same PRACH Occasions (ROs) as the preambles of a 4-step RACH, or in separate ROs.

MsgAPUSCH: The PUSCH transmissions may be organized into PUSCH Occasions (POs) which span multiple symbols and PRBs with optional guard periods and guard bands between consecutive POs. Each PO may consist of multiple DMRS ports and DMRS sequences, with each DMRS port/DMRS sequence pair known as PUSCH resource unit (PRU).

HARQ information: The HARQ information for DL-SCH, for UL-SCH, or for SL-SCH transmissions may consist of New Data Indicator (NDI), Transport Block size (TBS), Redundancy Version (RV), and HARQ process ID.

RTT duration/UE-gNB RTT: The RTT duration may be the minimum duration before a UL HARQ retransmission grant and/or a DL assignment is expected by the UE/MAC entity. The RTT duration may be indicated by the timer drx-HARQ-RTT-TimerDL and/or the timer drx-HARQ-RTT-TimerUL. The RTT duration may be indicated by a specific offset. The RTT duration may be associated with a TA value. For non-terrestrial networks, the RTT duration/UE-gNB RTT is the sum of the UE's TA value and a scheduling offset (e.g., kmac) provided in NTN-config.

The "UL data transmission" and/or "PUSCH transmission" may be referred to as PUSCH configured by CG, PUSCH scheduled by PDCCH, Msg3, and/or MsgA PUSCH. The terms "layer," "sublayer," and "entity" may be interchangeably used in some implementations of the present disclosure. The terms "disable HARQ," "disable a HARQ process," "disable HARQ feedback," and "HARQ feedback disabled" may be interchangeably used in some implementations of the present disclosure. The terms "assume," "determine," "expect," and "consider" may be interchangeably used in some implementations of the present disclosure. The terms "data," "TB," "(PHY/MAC/RLC/PDCH/SDAP/RRC) PDU," "(PHY/MAC/RLC/PDCH/SDAP/RRC) SDU," and "PDSCH transmission" may be interchangeably used in some implementations of the present disclosure. The terms "transmission" and "reception" may be interchangeably used in some implementations of the present disclosure. The terms "HARQ buffer" and "soft buffer" may be interchangeably used in some implementations of the present disclosure. The terms "deactivate" and "release" may be interchangeably used in some implementations of the present disclosure. The terms "SPS PDSCH release" and "SPS deactivation" may be interchangeably used in some implementations of the present disclosure. The terms "HARQ feedback," "positive acknowledgement," and "HARQ-ACK information" may be interchangeably used in some implementations of the present disclosure.

In NTN, the following three types (a)-(c) of service links may be supported. (a) Earth-fixed: provision by beam(s) continuously covering the same geographical areas all the time (e.g., the case of GEO satellites and HAPS). (b) Quasi-Earth-fixed: provision by beam(s) covering one geographic area for a finite period and a different geographic area during another period (e.g., the case of NGEO satellites generating steerable beams). (c) Earth-moving: provision by beam(s) which footprint slides over the Earth surface (e.g., the case of NGEO satellites generating fixed or non-steerable beams).

The NGEO may encompass circular orbits of constellation of satellites at altitude greater than or equal to 300 kilometers. This may include LEO at altitudes approximately between 300 kilometers and 1500 kilometers and MEO at altitudes between 1500 kilometers and 35786 kilometers. With NGEO satellites, the gNB may provide either quasi-Earth-fixed cells or Earth-moving cells, while the gNB operating with GEO satellite may provide Earth fixed cells.

The NTN may refer to networks, or segments of networks, using a spaceborne vehicle for transmission (e.g., using LEO satellites). In 3GPP NR Rel-17, a transparent payload-based LEO scenario may address at least 3GPP class 3 user equipment (UE) with GNSS capability. In some examples, the transparent payload-based LEO network may refer to a relay-based NTN. In this case, the LEO satellites may simply perform amplify-and-forward functions in space, and the base station/gNB may be located on the ground connected to the core NW. The orbit of 600 kilometers may be considered for such systems. 3GPP class 3 UE may refer to Power Class UE 3. The definition may be used for the UL TX power level set to be 23 decibels (dB) with a range of plus and minus 2 dB. This setting was mainly driven to ensure backward compatibility with prior technologies (i.e., Rel-15 NR/GSM/UMTS) so that network deployment topologies may remain similar. The GNSS may refer to the standard generic term for satellite navigation systems that provide autonomous geo-spatial positioning with global coverage. The GNSS may include, e.g., GPS, GLONASS, Galileo, BDS, and other regional systems. The GNSS may be usually operated on an orbit of 20200 kilometers.

FIG. 1 is a schematic diagram illustrating an LEO satellite 102 at an orbit of 600 km with transparent-payload deployment, according to an example implementation of the present disclosure.

The feeder link 101 may refer to a radio link between the LEO satellite 102 and the gNB 104. The service link 103 may refer to a radio link between the LEO satellite 102 and the UE 106. The satellite beam 105 may refer to a beam generated by an antenna onboard the LEO satellite 102. The diameter of the satellite beam 105 may be considered with a range from 50 to 1000 kilometers, thus impacting maximum differential delay among UEs in service.

The NTN payload transparently may forward the radio protocol received from the UE (via the service link 103) to the NTN Gateway (via the feeder link 101) and vice versa. The following connectivity (a) and (b) is supported by the NTN payload. (a) A gNB may serve multiple NTN payloads. (b) An NTN payload may be served by multiple gNBs. The NTN-payload may change the carrier frequency before re-transmitting it on the service link, and vice versa (respectively on the feeder link 101).

For NTN, the following (a) and (b) may be applied in addition to Network Identities. (a) A Tracking Area corresponds to a fixed geographical area. Any respective mapping is configured in the RAN. (b) A Mapped Cell ID.

The Non-Geosynchronous orbit (NGSO) may include Low Earth Orbit (LEO) at altitudes approximately between 300 kilometers and 1500 kilometers and Medium Earth Orbit (MEO) at altitudes approximately between 7000 kilometers and 25000 kilometers. With NGSO satellites, the gNB can provide either quasi-Earth-fixed cell coverage or Earth-moving cell coverage, while gNB operating with GSO satellite can provide Earth fixed cell coverage. In the case of NGSO, the service link switch may be referred to as a change of serving satellite. The support for Non-Terrestrial Networks (NTNs) may be facilitated by the mechanisms described in the present disclosure.

In the downlink, the gNB may dynamically allocate resources to the UEs via the C-RNTI on PDCCH(s). A UE may always monitor the PDCCH(s) in order to find possible assignments when its downlink reception is enabled (activity governed by DRX when configured). When CA is configured, the same C-RNTI may apply to all serving cells.

The gNB may preempt an ongoing PDSCH transmission to one UE with a latency-critical transmission to another UE. The gNB may configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB may allocate downlink resources for the initial HARQ transmissions to the UEs. The RRC may define the periodicity of the configured downlink assignments while a PDCCH addressed to CS-RNTI can either signal and activate the configured downlink assignment, or deactivate it (e.g., a PDCCH addressed to CS-RNTI may indicate that the downlink assignment can be implicitly reused according to the periodicity defined by the RRC, until deactivated). When required, retransmissions may be explicitly scheduled on PDCCH(s). The dynamically allocated downlink reception may override the configured downlink assignment in the same serving cell if they overlap each other in time. Otherwise, a downlink reception according to the configured downlink assignment may be assumed, if activated.

The UE may be configured with (up to 8) active configured downlink assignments for a given BWP of a serving cell. When more than one active downlink assignment for the given BWP of the serving cell is configured, the network may decide which of these configured downlink assignments are active at a time (including all of them); and each configured downlink assignment may be activated separately using a DCI command. Deactivation of configured downlink assignments may be done using a DCI command, which can either deactivate a single configured downlink assignment or multiple configured downlink assignments jointly.

In the uplink, the gNB may dynamically allocate resources to the UEs via the C-RNTI on PDCCH(s). A UE may always monitor the PDCCH(s) in order to find possible grants for uplink transmission when its downlink reception is enabled (activity governed by DRX when configured). When CA is configured, the same C-RNTI may apply to all serving cells.

The gNB may cancel a PUSCH transmission, or a repetition of a PUSCH transmission, or an SRS transmission of a UE for another UE with a latency-critical transmission. The gNB may configure the UEs to monitor cancelled transmission indications using CI-RNTI on a PDCCH. If a UE receives the cancelled transmission indication, the UE may cancel the PUSCH transmission from the earliest symbol overlapped with the resource or the SRS transmission overlapped with the resource indicated by cancellation (as specified in 3GPP Technical Specification (TS) 38.213).

In addition, with Configured Grants, the gNB may allocate uplink resources for the initial HARQ transmissions and HARQ retransmissions to the UEs. Two types of configured uplink grants may be defined. With Type 1, RRC may directly provide the configured uplink grant (including the periodicity). With Type 2, RRC may define the periodicity of the configured uplink grant while a PDCCH addressed to CS-RNTI can either signal and activate the configured uplink grant, or deactivate it (e.g., a PDCCH addressed to CS-RNTI may indicate that the uplink grant can be implicitly reused according to the periodicity defined by RRC, until deactivated).

If the UE is not configured with enhanced intra-UE overlapping resources prioritization, the dynamically allocated uplink transmission may override the configured uplink grant in the same serving cell if they overlap each other in time. Otherwise, an uplink transmission according to the configured uplink grant may be assumed, if activated. The retransmissions other than the repetitions may be explicitly allocated via PDCCH(s) or via configuration of a retransmission timer.

The UE may be configured with (up to 12) active configured uplink grants for a given BWP of a serving cell. When more than one active configured uplink grant for the given BWP of the serving cell is configured, the network may decide which of these configured uplink grants are active at a time (including all of them). Each configured uplink grant may either be of Type 1 or Type 2. For Type 2, activation and deactivation of the configured uplink grants may be independent among the serving cells. When more than one Type 2 configured grant is configured, each configured grant may be activated separately using a DCI command and deactivation of Type 2 configured grants may be done using a DCI command, which can either deactivate a single configured grant configuration or multiple configured grant configurations jointly.

When SUL is configured, the network may ensure that an active configured uplink grant on SUL does not overlap in time with another active configured uplink grant on the other UL configuration.

For both dynamic grant and configured grant for a transport block, two or more repetitions may be in one slot, or across a slot boundary in consecutive available slots with each repetition in one slot. For both dynamic grant and configured grant Type 2, the number of repetitions may be also dynamically indicated in the L1 signaling. The dynamically indicated number of repetitions may override the RRC configured number of repetitions, if both are present.

The UE may have an uplink rate control function which manages the sharing of uplink resources between radio bearers. The RRC may control the uplink rate control function by giving each bearer per logical channel a priority, a prioritized bit rate (PBR), and a buffer size duration (BSD). In addition, mapping restrictions can be configured.

The uplink rate control function may ensure that the UE serves the logical channel(s) in the following sequence (a) and (b). (a) All relevant logical channels in decreasing priority order up to their PBR. (b) All relevant logical channels in decreasing priority order for the remaining resources assigned by the grant.

In case the PBRs are all set to zero, step (a) above may be skipped and the logical channels may be served in strict priority order. The UE may maximize the transmission of higher priority data. The mapping restrictions tell the UE which logical channels are relevant for the grant received. If no mapping restrictions are configured, all logical channels may be considered. If more than one radio bearer has the same priority, the UE shall serve these radio bearers equally.

With LCP restrictions in the MAC sublayer, the RRC can restrict the mapping of a logical channel to a subset of the configured cells, numerologies, PUSCH transmission durations, and configured grant configurations and may control whether a logical channel can utilize the resources allocated by a Type 1 Configured Grant or whether a logical channel can utilize dynamic grants indicating a certain physical priority level. With such restrictions, it then becomes possible to reserve, for instance, the numerology with the largest subcarrier spacing and/or shortest PUSCH transmission duration for URLLC services. Furthermore, the RRC can associate logical channels with different SR configurations (e.g., to provide more frequent SR opportunities to URLLC services).

The MAC sublayer of the UE may support error correction and/or repetition through HARQ functionality. The HARQ functionality may ensure delivery between peer entities at Layer 1 (e.g., physical layer).

For NTN, the network may disable uplink HARQ feedback for downlink transmission at the UE receiver (e.g., to cope with long propagation delays). Even if the HARQ feedback is disabled, the HARQ processes may be still configured. The enabling/disabling of the HARQ feedback may be a network decision signaled semi-statically to the UE by RRC signaling. The enabling/disabling of the HARQ feedback for downlink transmission may be configurable on a per-UE and/or per-HARQ process basis via RRC signaling.

For NTN, the network may disable HARQ uplink retransmissions at the UE transmitter. Even if the HARQ uplink retransmissions are disabled, the HARQ processes may still be configured. The enabling/disabling of the HARQ uplink retransmissions may be configurable on a per-UE, per-HARQ process, and/or per-LCH basis.

The network criteria of enabling/disabling the HARQ feedback may not be specified. Examples for possible criteria may be latency or throughput service requirements, transmission roundtrip time etc. Other criteria may not be excluded. The Semi-Persistent Scheduling (SPS) may be supported for the HARQ processes with the enabled and disabled HARQ feedback.

Multiple transmissions of the same Transport Block (TB) in a bundle (e.g., MAC schedules packets in a bundle with pdsch-AggregationFactor>1 in downlink and pusch-AggregationFactor>1 in the uplink) according to 3GPP NR Rel-15 may be possible and may be useful to lower the residual Block Error Rate (BLER), particularly in case the HARQ feedback is disabled. Soft combining of multiple transmissions according to 3GPP NR Rel-15 may be supported in the receiver. Multiple transmissions of the same TB (e.g., MAC schedules the same TB on the same HARQ process without the New Data Indicator (NDI) being toggled) may be possible and may also be useful to lower the residual BLER, particularly in case the HARQ feedback is disabled. Soft combining of multiple transmissions of the same TB by the MAC scheduler (e.g., MAC schedules the same TB on the same HARQ process without the NDI being toggled) according to 3GPP NR Rel-15 may be supported in the receiver. If the feedback is disabled for a selective number (e.g., not all) of the HARQ processes, the configuration parameters for different HARQ processes may need to be different.

Figure 2:
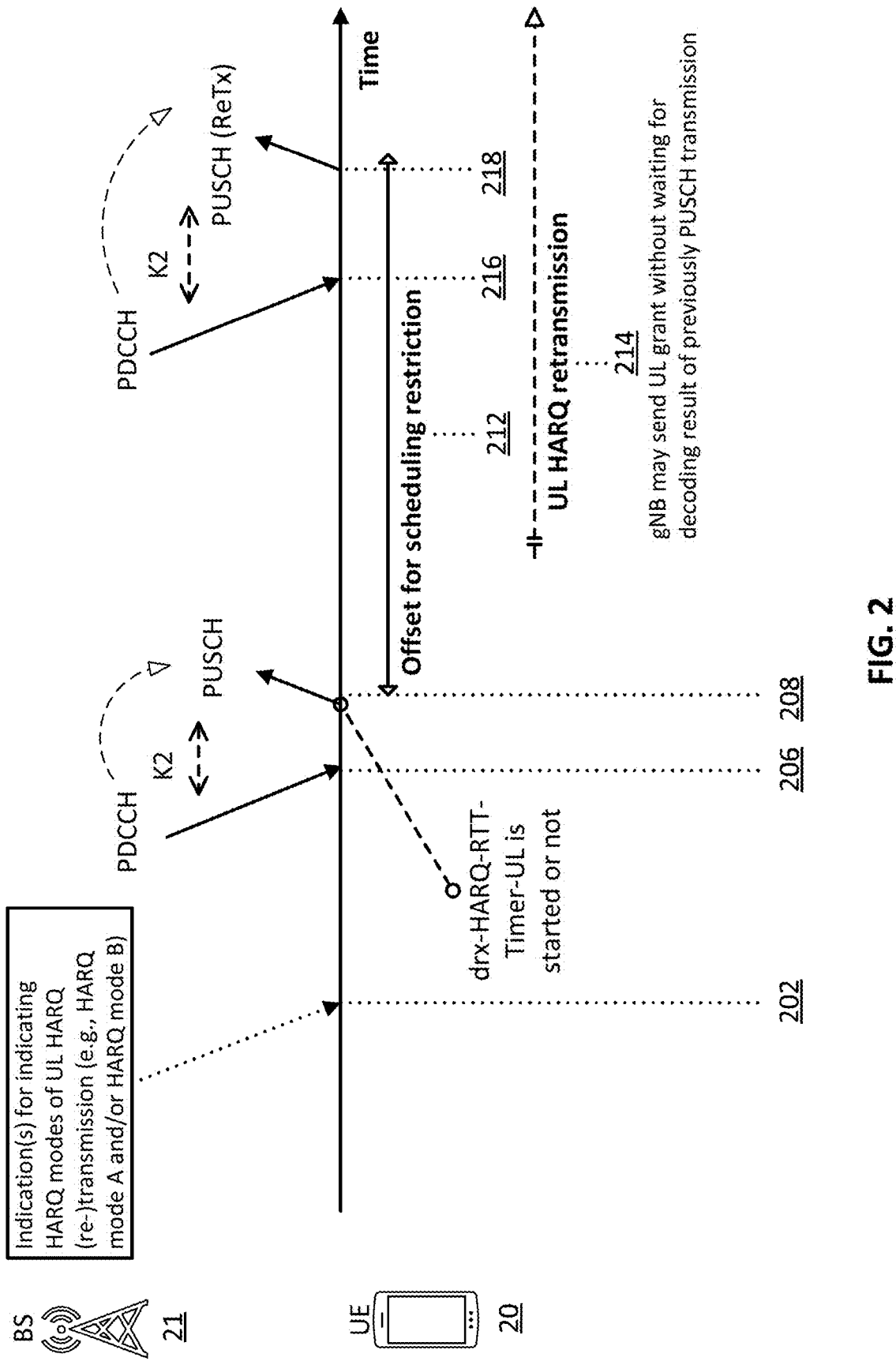
FIG. 2 is a schematic diagram illustrating an uplink (UL) (re-)transmission scheme, according to an example implementation of the present disclosure.

FIG. 2 is a schematic diagram illustrating a UL (re-) transmission scheme, according to an example implementation of the present disclosure.

In some implementations, the UE may be indicated to disable the UL HARQ retransmission (e.g., the UE may not perform the UL retransmission for the corresponding HARQ buffer). In some implementations, the UE may be indicated to monitor the PDCCH for receiving a possible retransmission scheduling. In some implementations, it is possible that the gNB may send a new UL grant without waiting for the decoding result of the previous PUSCH transmission. In light of this, some enhancements for UL retransmission scheme may be needed to improve the efficiency of the wireless communication system.

As depicted in FIG. 2, a UE 20 may include a HARQ entity for each serving Cell of a BS 21. The HARQ entity may maintain a number of parallel HARQ processes. Each HARQ process may be associated with a HARQ process identifier (ID). The HARQ entity may direct HARQ information and associated TBs received on the UL-SCH to the corresponding HARQ processes. The number of parallel HARQ processes per HARQ entity may be specified in 3GPP TS 38.214. The HARQ processes may be UL HARQ processes. The HARQ processes may be used for UL-SCH data transmission.

Table 1 below includes an example of HARQ modes of UL HARQ retransmission.

TABLE 1

| HARQ Modes | Enable/Disable UL HARQ retransmission | Behaviors for UL HARQ retransmission |
|---|---|---|
| HARQ Mode A | "Enabling" UL HARQ retransmission | Alt 1: UL HARQ retransmission(s) scheduling based on previous/initial transmission packet decoding result in gNB. (e.g., The time duration between two consecutive PUSCH transmissions should >1 RTT) Alt 2: UL HARQ retransmission(s) scheduling not based on previous/initial transmission packet decoding result in gNB. (e.g., The time duration between two consecutive PUSCH transmissions may <1 RTT) Note: The Alt 2 of HARQ Mode A may be denoted as blind retransmission. |
| HARQ Mode B | "Disabling" UL HARQ retransmission | UL HARQ with no retransmission |

In Table 1, different HARQ modes of UL HARQ retransmission may be applied (for the UE). For a UL HARQ process, the UE may be informed, by the indication(s) for indicating HARQ modes of UL HARQ (re-) transmission, of the HARQ mode to which the UL HARQ process is related. In some implementations, the UE may determine the HARQ modes by itself based on some conditions. The UE may perform different behaviors (as mentioned in the present disclosure) based on the indicated/determined HARQ modes for the UL HARQ process.

For HARQ mode A: The UL HARQ retransmission (for a HARQ process) is enabled, and the UL HARQ retransmission (for the HARQ process) may occur after an RTT duration. The UE behaviors may include the following (a)-(c).

(a) The UE may perform the UL HARQ retransmission (for the HARQ process).

(b) The UE may not receive a UL HARQ retransmission grant before an RTT duration.

(c) The UE may receive a UL HARQ retransmission grant after an RTT duration.

For HARQ mode A: The UL HARQ retransmission (for a HARQ process) is enabled, and the UL HARQ retransmission (for the HARQ process) may occur before or after an RTT duration. The UE behaviors may include the following (a) and (b).

(a) The UE may perform the UL HARQ retransmission (for the HARQ process).

(b) The UE may receive a UL HARQ retransmission grant before or after an RTT duration.

For HARQ mode B: The UL HARQ retransmission (for a HARQ process) is disabled. The UE may not perform the UL HARQ retransmission (for the HARQ process).

In step 202 of FIG. 2, the UE 20 may receive indication(s) for HARQ modes of UL HARQ (re-)transmission (e.g., HARQ mode A and/or HARQ mode B) from the BS 21.

The indication(s) for the HARQ modes of the UL HARQ (re-)transmission may be RRC/MAC/PHY signaling. The indication(s) for the HARQ modes of the UL HARQ (re-)transmission may be included in an IE (e.g., at least one of MAC-CellgroupConfig IE, PDCCH-config IE, PDCCH-ServingCellConfig IE, PUSCH-ServingCellConfig IE, ServingCellConfig IE, BWP-DownlinkDedicated IE, PUSCH-config IE, LogicalChannelConfig IE, and ConfiguredGrantConfig IE). The indication(s) for the HARQ modes of the UL HARQ (re-)transmission may be indicated per HARQ process, per MAC entity, per HARQ entity, and/or per UE. If the blind retransmission indication is indicated per HARQ entity, per MAC entity, and/or per UE, the indication(s) may indicate that all the (UL) HARQ process(s) of the HARQ entity/MAC entity/UE may be applied to the function of the HARQ modes of the UL HARQ (re-)transmission.

In some implementations, the indication(s) for the HARQ modes of the UL HARQ (re-)transmission may further indicate HARQ process(es). Specifically, one or more HARQ processes may be indicated to apply the indicated HARQ modes of the UL HARQ (re-)transmission. In other words, the indication(s) for the HARQ modes of the UL HARQ (re-)transmission may indicate a HARQ process that is related to the indicated HARQ mode. Specifically, the indication(s) for the HARQ modes of the UL HARQ (re-)transmission may indicate whether the HARQ process can employ the UL HARQ retransmission and/or whether the UL HARQ retransmission can occur before/after an RTT duration.

In some implementations, the indication(s) may include one or more indications. A first indication may indicate whether the UL HARQ retransmission is HARQ mode A/HARQ mode B. The first indication may be RRC/MAC/PHY signaling. The first indication may include a bitmap to indicate the HARQ processes for which the UL HARQ retransmission is HARQ mode A or HARQ mode B. Each bit of the first bitmap may be associated with one HARQ process. For example, if the bit of the first bitmap equals a first value (e.g., 0), the UL HARQ retransmission of the corresponding HARQ process may be HARQ mode B. For example, if the bit of the first bitmap equals a second value (e.g., 1), the UL HARQ retransmission of the corresponding HARQ process may be HARQ mode A.

The first indication may indicate a HARQ mode. The first indication may be used to set the HARQ mode per HARQ process ID. The first/leftmost bit may correspond to HARQ process ID '0,' the next bit may correspond to HARQ process ID '1,' and so on. The bits corresponding to HARQ process IDs that are not configured may be ignored. A bit set to one may identify a HARQ process with HARQ mode A and a bit set to zero may identify a HARQ process with HARQ mode B. The indication(s) for indicating the HARQ modes of the UL HARQ (re-)transmission may include a list of the HARQ processes for which the UL HARQ retransmission is HARQ mode A or HARQ mode B. For example, the first list may indicate one or more HARQ process IDs.

The UE may determine whether the UL HARQ retransmission is HARQ mode A or HARQ mode B (for a HARQ process) based on whether the UL HARQ retransmission indication is configured (for the HARQ process) or not. For example, if the UL HARQ retransmission indication is configured for a HARQ process, the UE may consider that the UL HARQ retransmission for the HARQ process is HARQ mode B. If the UL HARQ retransmission indication is not configured for a HARQ process, the UE may consider that the UL HARQ retransmission for the HARQ process is HARQ mode A.

In some implementations, the second indication may indicate whether the UE could expect the UL retransmission before and/or after an RTT duration. If the UE could expect the UL retransmission before an RTT duration, it may be denoted as enabled blind retransmission. If the UE expects the UL retransmission only after an RTT duration, it may be denoted as disabled blind retransmission.

The second indication may be RRC/MAC/PHY signaling. The second indication may only be indicated if the UL HARQ retransmission of the corresponding HARQ process is enabled. In other words, the second indication may not be provided if the UL HARQ retransmission of the corresponding HARQ process is disabled. The second indication may be used to control the UE actions on drx-HARQ-RTT timer, drx-retransmissionTimer, and/or drx-inactivity timer.

If the UE receives the second indication, the UE may need to monitor a PDCCH (e.g., based on a drx retransmission timer) for a possible scheduling for the retransmission. The blind retransmission indication may only be configured/indicated for the NTN.

When the blind retransmission is enabled, the UE may not expect to receive two consecutive PUSCHs scheduled for the same HARQ process that cannot ensure UE's processing time. When a blind transmission indication is provided by a DCI format and the receiving timing of the DCI cannot ensure the processing time (e.g., the DCI schedules a PUSCH with a scheduling offset shorter than the minimum time gap between two consecutive PUSCHs), the UE may ignore the scheduling indication for the PUSCH by the PDCCH. The second indication may be a blind retransmission indication. The second indication may be used to enable/disable the function of the blind retransmission.

The UE may determine whether the blind retransmission is enabled or disabled (for a HARQ process) based on whether the second indication is configured (for the HARQ process) or not. For example, if the second indication is configured for a HARQ process, the UE may consider that the blind retransmission for the HARQ process is enabled. If the second indication is not configured for a HARQ process, the UE may consider that the UL HARQ retransmission for the HARQ process is disabled.

The UE may determine whether the blind retransmission is enabled or disabled (for a HARQ process) based on whether the UL HARQ retransmission indication is configured (for the HARQ process) or not. For example, if the UL HARQ retransmission indication is configured for a HARQ process, the UE may consider that the blind retransmission for the HARQ process is enabled. If the UL HARQ retransmission indication is not configured for a HARQ process, the UE may consider that the UL HARQ retransmission for the HARQ process is disabled.

If the UL HARQ retransmission is disabled, the UE may assume that the blind retransmission of the HARQ process is enabled. If the UL HARQ retransmission of a HARQ process is not disabled, the UE may assume that the blind retransmission of the HARQ process is disabled.

In some implementations, one or more specific HARQ processes (e.g., HARQ process Identifier 0) may be indicated as HARQ mode A or HARQ mode B of UL HARQ retransmissions (by default). The specific HARQ process(s) may be indicated as HARQ mode A by default. Specifically, the specific HARQ process(s) is not allowed to be indicated as HARQ mode B. The UE may receive a UL HARQ retransmission grant for the specific HARQ process before or after an RTT duration by default. The UE may ignore the indication(s) for HARQ modes for the specific HARQ process(s).

In some implementations, the UE may determine the HARQ mode of the UL transmission for a HARQ process based on LCP (procedure). The UE may determine which HARQ mode of the UL transmission to apply for a HARQ process based on the data stored in the HARQ buffer of the HARQ process. If the data stored in the HARQ buffer of the HARQ process includes data coming from a first LCH(s)/RB(s), the UE may apply HARQ mode A for the HARQ process. If the data stored in the HARQ buffer of the HARQ process includes data coming from a second LCH(s)/RB(s), the UE may apply HARQ mode B for the HARQ process. The UE may determine which HARQ mode of the UL HARQ retransmission to apply based on a parameter(s) configured in the LogicalChannelConfig IE. The parameter(s) may be priority, maxPUSCH-Duration, configuredGrantTypeAllowed, logicalChannelGroup, allowedCG-List, allowedPHY-PriorityIndex, and/or a new parameter. Specifically, the parameter(s) may be associated with a HARQ process. The UE may determine which HARQ mode of the UL HARQ retransmission to apply for the HARQ process based on the parameter(s).

In some implementations, the Logical Channel Prioritization (LCP) procedure may be applied whenever a new transmission is performed. When a new transmission is performed, the UE may select the logical channels for each UL grant that satisfy a condition (e.g., based on a parameter (allowedHARQ-mode)), if configured, including the HARQ mode for the HARQ process associated to the UL grant.

In some implementations, if a logical channel is configured with a parameter (e.g., allowedHARQ-mode), it can only be mapped to a HARQ process with the same HARQ mode. The parameter (e.g., allowedHARQ-mode) may set the allowed HARQ mode for transmission. The parameter (e.g., allowedHARQ-mode) may include the HARQ mode for the HARQ process associated to the UL grant.

In some implementations, the UE may receive a UL grant indicating a HARQ process, and the UE may perform a transmission for the HARQ process via the UL grant based on a Logical Channel Prioritization (LCP) procedure, then the UE may determine whether the logical channel is allowed to be selected for the transmission based on the parameter and a HARQ mode of the HARQ process.

The indication(s) for indicating the HARQ modes of the UL HARQ (re-)transmission may be indicated via CG configuration (e.g., ConfiguredGrantConfig IE). The indication(s) for indicating the HARQ modes of the UL HARQ (re-)transmission via CG configuration may only be applied for configured UL (re-)transmission(s) which is configured by the CG configuration.

The UE may determine which HARQ mode of UL HARQ retransmission to apply based on the indication(s) included in the CG configuration after performing a UL transmission (for the HARQ process) which is scheduled by the CG configuration.

If the UE determines which HARQ mode of UL HARQ retransmission to apply based on the indication(s) (for a HARQ process) included in the CG configuration after performing a UL transmission (for the HARQ process) which is scheduled by the CG configuration, the UE may ignore the (field of) indication(s) configured by another IE (e.g., in MAC-CellgroupConfig IE, PDCCH-config IE, PDCCH-ServingCellConfig IE, PUSCH-ServingCellConfig IE, ServingCellConfig IE, BWP-DownlinkDedicated IE, PUSCH-config IE, LogicalChannelConfig IE). Specifically, the UE may only apply the indication(s) (for a HARQ process) included in the CG configuration.

If the UE determines which HARQ mode of UL HARQ retransmission to apply based on the indication(s) (for a HARQ process) included in an IE (e.g., MAC-CellgroupConfig IE, PDCCH-config IE, PDCCH-ServingCellConfig IE, PUSCH-ServingCellConfig IE, ServingCellConfig IE, BWP-DownlinkDedicated IE, PUSCH-config IE, LogicalChannelConfig IE) after performing a UL transmission (for the HARQ process) which is scheduled by a dynamic scheduling, the UE may ignore the (field of) indication(s) configured in the CG configuration. Specifically, the UE may only apply the indication(s) (for a HARQ process) included in the IE (e.g., MAC-CellgroupConfig IE, PDCCH-config IE, PDCCH-ServingCellConfig IE, PUSCH-ServingCellConfig IE, ServingCellConfig IE, BWP-DownlinkDedicated IE, PUSCH-config IE, LogicalChannelConfig IE).

In step 206 of FIG. 2, while the UE monitors the PDCCH, the UE may receive a UL grant on a PDCCH (e.g., via C-RNTI). The UL grant on the PDCCH may include a DCI format, an offset K2 (e.g., based on time domain resource assignment), and/or some parameters for the scheduling of PUSCH (in step 208). The K2 may be the slot offset between the DCI/PDCCH and its scheduled PUSCH. The time domain resource assignment may be indicated based on PUSCH-TimeDomainResourceAllocation IE, which is used to configure a time domain relationship between the PDCCH and the PUSCH. The PUSCH-TimeDomainResourceAllocationList may contain one or more of such PUSCH-TimeDomainResourceAllocations. The network may indicate in the UL grant which of the configured time domain allocations the UE may apply for that UL grant. The UE may determine the bit width of the DCI field based on the number of entries in the PUSCH-TimeDomainResourceAllocationList. The value '0' in the DCI field may refer to the first element in this list, the value '1' in the DCI field may refer to the second element in this list, and so on.

In step 208, the UE may be scheduled/indicated/configured to transmit a PUSCH. The PUSCH may be scheduled by a dynamic scheduling via the PDCCH (e.g., based on the step 206), and/or a CG configuration.

If the UE receives a PDCCH/DCI indicating a UL transmission for a HARQ process, and the UL HARQ retransmission of the HARQ process is HARQ mode B, the UE may consider the NDI to have been toggled for the corresponding HARQ process regardless of the value of the NDI. Specifically, the UE may not consider whether this transmission/reception is a new transmission or retransmission based on whether NDI is toggled or not.

After receiving the PDCCH and/or transmitting the PUSCH, the UE may determine whether to start the timer drx-HARQ-RTT-TimerUL based on the indication(s) for the HARQ modes of the UL HARQ (re-)transmission. The indication(s) may include a first indication as to whether the UL HARQ retransmission is HARQ mode A/HARQ mode B and/or a second indication as to whether the UE could expect the UL retransmission before or after an RTT duration.

If a PDCCH indicates a UL new transmission or retransmission, the UE may determine whether to start the timer drx-HARQ-RTT-TimerUL based on the indication(s) for the HARQ modes of the UL HARQ (re-)transmission.

If data (e.g., MAC PDU) is transmitted via CG, the UE may determine whether to start the timer drx-HARQ-RTT-TimerDL based on the indication(s) for the HARQ modes of the UL HARQ (re-)transmission. If the indication(s) indicates HARQ mode A, the UE may start the timer drx-HARQ-RTT-TimerUL for the corresponding HARQ process in the first symbol after the end of the first transmission (within a bundle) of the corresponding PUSCH transmission. If the indication(s) indicates HARQ mode A, the UE may not start the timer drx-HARQ-RTT-TimerUL for the corresponding HARQ process in the first symbol after the end of the first transmission (within a bundle) of the corresponding PUSCH transmission. If the indication(s) indicates HARQ mode B, the UE may not start the timer drx-HARQ-RTT-TimerUL for the corresponding HARQ process in the first symbol after the end of the first transmission (within a bundle) of the corresponding PUSCH transmission. Specifically, the timer drx-HARQ-RTT-TimerUL may be HARQ mode B.

If the indication(s) for the HARQ modes of the UL HARQ (re-)transmission (for a HARQ process) is not configured, the UE may start the timer drx-HARQ-RTT-TimerUL for the corresponding HARQ process (in the first symbol after the end of the first transmission (within a bundle) of the corresponding PUSCH transmission). If the indication(s) for the HARQ modes of the UL HARQ (re-)transmission is not configured, the UE may stop the timer drx-RetransmissionTimerUL for the corresponding HARQ process. Otherwise, the UE may not stop the timer drx-RetransmissionTimerUL.

If the indication(s) for the HARQ modes of the UL HARQ (re-)transmission (for a HARQ process) is configured, the UE may not start the timer drx-HARQ-RTT-TimerUL for the corresponding HARQ process (in the first symbol after the end of the first transmission (within a bundle) of the corresponding PUSCH transmission). If the indication(s) for the HARQ modes of the UL HARQ (re-)transmission (for a HARQ process) is configured, the UE may stop/disable the timer drx-HARQ-RTT-TimerUL for the corresponding HARQ process (e.g., if the timer drx-HARQ-RTT-TimerUL is running). If the indication(s) for the HARQ modes of the UL HARQ (re-)transmission (for a HARQ process) is configured, the UE may (re-)start, stop, and/or disable the timer drx-RetransmissionTimerUL for the corresponding HARQ process. If the indication(s) for the HARQ modes of the UL HARQ (re-)transmission (for a HARQ process) is configured, the UE may (re-)start, stop, and/or disable the timer configuredGrantTimer and/or the timer cg-RetransmissionTimer for the corresponding HARQ process.

If the indication(s) for indicating the HARQ modes of the UL HARQ (re-)transmission (for a HARQ process) is configured, the UE may flush the HARQ buffer for the corresponding HARQ process (in the first symbol after the end of the first/last transmission (within a bundle) of the corresponding PUSCH transmission).

If the UL HARQ retransmission (of a HARQ process) is HARQ mode B, the UE may not start the timer drx-HARQ-RTT-TimerUL for the corresponding HARQ process (in the first symbol after the end of the first transmission (within a bundle) of the corresponding PUSCH transmission). If the UL HARQ retransmission (of a HARQ process) is HARQ mode B, the UE may stop the timer drx-HARQ-RTT-TimerUL for the corresponding HARQ process (e.g., if the timer drx-HARQ-RTT-TimerUL is running). If the UL HARQ retransmission (of a HARQ process) is HARQ mode B, the UE may (re-)start, stop, and/or disable the timer drx-RetransmissionTimerUL (if running) for the corresponding HARQ process. If the UL HARQ retransmission (of a HARQ process) is HARQ mode B, the UE may (re-)start, stop, and/or disable the timer configuredGrant-Timer and/or the timer cg-RetransmissionTimer for the corresponding HARQ process.

If the UL HARQ retransmission (of a HARQ process) is HARQ mode B, the UE may flush the HARQ buffer for the corresponding HARQ process (in the first symbol after the end of the first/last transmission (within a bundle) of the corresponding PUSCH transmission).

If the indication(s) for the HARQ modes of the UL HARQ (re-)transmission (for a HARQ process) is configured, the timer drx-HARQ-RTT-TimerUL, the timer drx-RetransmissionTimerUL, the timer configuredGrantTimer and/or the timer cg-RetransmissionTimer may be disabled/absent and/or not configured. If the indication(s) for the HARQ modes of the UL HARQ (re-)transmission (for a HARQ process) is configured and/or indicates the HARQ mode A/HARQ mode B, the timer drx-HARQ-RTT-TimerUL may be set/configured as value '0'.

If the UL HARQ retransmission of a HARQ process is HARQ mode B, the timer drx-HARQ-RTT-TimerUL, the timer drx-RetransmissionTimerUL, the timer configuredGrantTimer and/or the timer cg-RetransmissionTimer may be disabled/absent and/or not configured. If the UL HARQ retransmission of a HARQ process is HARQ mode B, the timer drx-HARQ-RTT-TimerUL may be set/configured as value '0.'

In steps 212 to 218 of FIG. 2, the UE may determine how/when to monitor the PDCCH for receiving the possible UL (blind) retransmission. The UE may monitor the PDCCH discontinuously using the DRX operation. The UE/MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI.

In some implementations, a timer may be used for PDCCH monitoring (for receiving the UL (blind) retransmission). The UE may consider a time while the timer is running as the (DRX) Active Time. While the timer is running, and/or the UE considers the current time as Active Time (based on the timer), the UE may monitor the PDCCH (on the serving cells in this DRX group as specified in 3GPP TS 38.213). The timer may be a new timer.

The length of time associated with the timer may be the maximum duration until a UL grant for monitoring the PDCCH for blind retransmission. The timer may be only configured for the NTN. The timer may be at least one of a new (drx) timer, a drx-onDurationTimer, a drx-Inactivity-Timer, a drx-RetransmisionTimerDL, a drx-Retransmission-TimerUL, a configuredGrantTimer, a cg-Retransmission-Timer, a drx-HARQ-RTT-TimerDL, and a drx-HARQ-RTT-TimerUL.

The length of the time may be an RTT duration. The timer may be associated with a HARQ process (e.g., for which UL HARQ retransmission is HARQ mode A/HARQ mode B and/or for which the HARQ modes of the UL HARQ (re-)transmission are indicated). The timer may be applied (e.g., (re-)start the timer, stop the timer, and/or perform UE actions upon the timer expiring) based on the indication(s) for the HARQ modes of the UL HARQ (re-)transmission. The timer may be applied (e.g., (re-)start the timer, stop the timer, and/or perform UE actions upon the timer expiring) if the indication(s) for the HARQ modes of the UL HARQ (re-)transmission is configured. The timer may be applied (e.g., (re-)start the timer, stop the timer, and/or perform UE actions upon the timer expiring) if the UL HARQ retransmission (of the HARQ process) is enabled. The timer may be applied (e.g., (re-)start the timer, stop the timer, and/or perform UE actions upon the timer expiring) if the blind retransmission (of the HARQ process) is enabled.

The timer may be applied (e.g., (re-)start the timer, stop the timer, and/or perform UE actions upon the timer expiring) if the UE does not start the timer drx-HARQ-RTT-TimerUL for the HARQ process. The timer may be applied (e.g., (re-)start the timer, stop the timer, and/or perform UE actions upon the timer expiring) if the timer drx-HARQ-RTT-TimerUL is disabled/absent and/or not configured. The timer may be applied (e.g., (re-)start the timer, stop the timer, and/or perform UE actions upon the timer expiring) if the timer drx-HARQ-RTT-TimerUL is set/configured as value '0.'

The timer may be applied (e.g., (re-)start the timer, stop the timer, and/or perform UE actions upon the timer expiring) if the UE is indicated with the HARQ mode A by the indication(s) for the HARQ modes of the UL HARQ (re-)transmission. The timer may be applied (e.g., (re-)start the timer, stop the timer, and/or perform UE actions upon the timer expiring) if the UE is indicated with the HARQ mode B by the indication(s) for the HARQ modes of the UL HARQ (re-)transmission.

The length of time associated with the offset and/or the second timer may be indicated by K2. The length of time associated with the offset and/or the second timer may be a number of a time unit (e.g., sub-slot, slot, symbol, subframe, system frame, milli-second, and/or second). The number of the time unit may be configured by the NW (for the HARQ process). The length of time associated with the offset and/or the second timer may be the minimum duration before a UL grant for HARQ retransmission is expected by the UE/MAC entity.

For DL, the HARQ feedback may be enabled/disabled, but the HARQ processes may remain configured. The criteria and decision to enable/disable the HARQ feedback may be under network control and may be signaled to the UE via the RRC in a semi-static manner. The enabling/disabling on the HARQ feedback for downlink transmission may be at least configurable per HARQ process via UE-specific RRC signaling.

For HARQ processes with DL HARQ feedback disabled, the timer drx-HARQ-RTT-TimerDL may not be started. For HARQ processes where the gNB may send a UL grant without waiting for the decoding result of the previous PUSCH transmission, no new network scheduling restrictions may be introduced to schedule subsequent grants (e.g., up to network implementation). For HARQ processes with DL HARQ feedback enabled, the timer drx-HARQ-RTT-TimerDL length may be increased by an offset (e.g., existing values within value range increased by the offset). For a DL HARQ process with disabled HARQ feedback, the UE may not be expected to receive another PDSCH or set of slot-aggregated PDSCHs scheduled for the given HARQ process that starts until X after the end of the reception of the last PDSCH or slot-aggregated PDSCH for that HARQ process.

Figure 3:
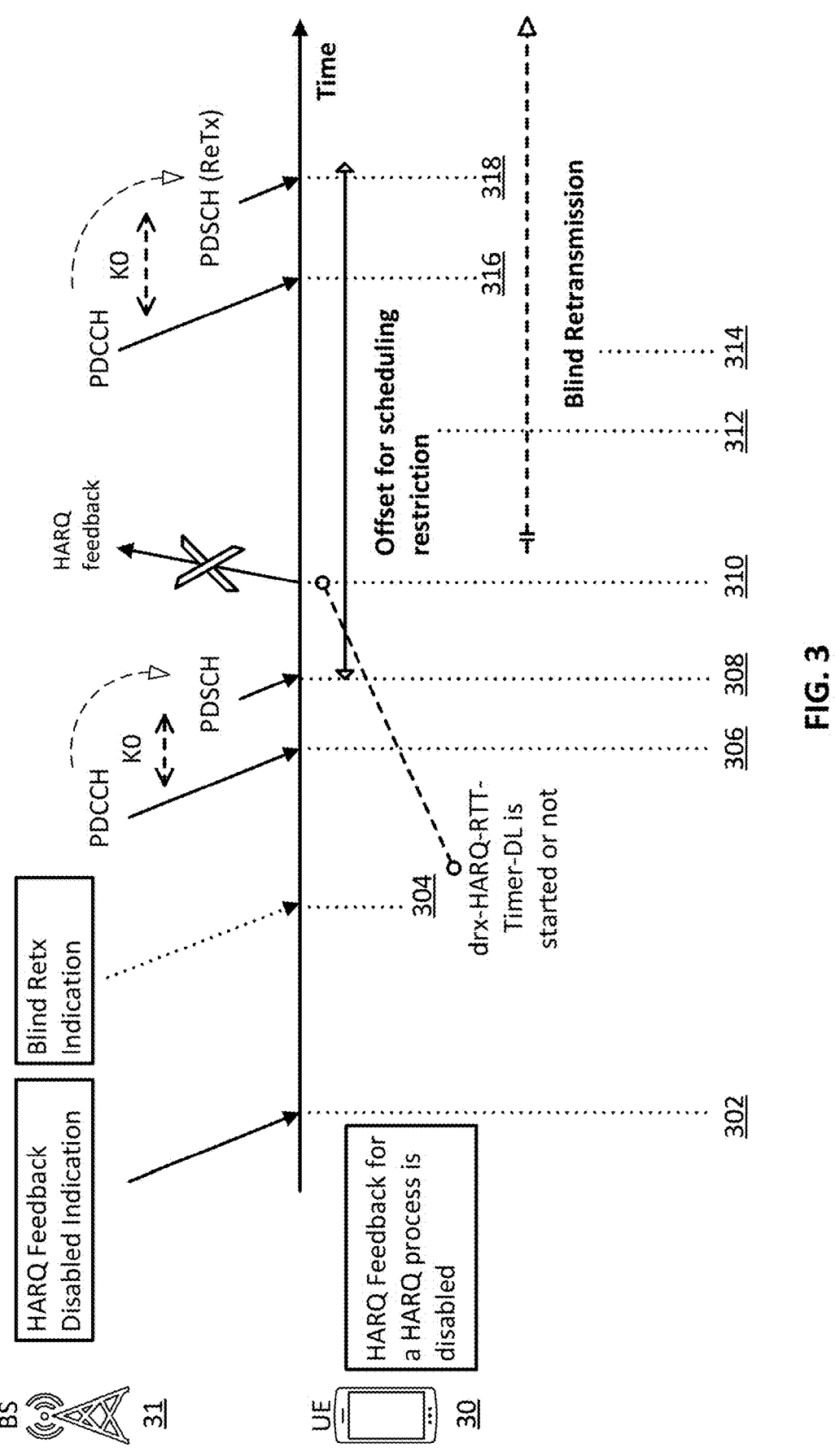
FIG. 3 is a schematic diagram illustrating a downlink (DL) retransmission scheme based on disabled HARQ feedback, according to an example implementation of the present disclosure.

FIG. 3 is a schematic diagram illustrating a DL retransmission scheme based on disabled HARQ feedback according to an example implementation of the present disclosure.

The characteristics of disabled HARQ feedback may be different from enabled HARQ feedback. For example, the disabled HARQ feedback may not support the HARQ feedback function (e.g., the UE may not need to transmit a HARQ feedback for a HARQ process which is disabled HARQ feedback). In view of this, some enhancements on top of disabled HARQ may be needed to improve the efficiency of the wireless communication system.

As illustrated in FIG. 3, a UE 30 may include a HARQ entity for each serving cell of a BS 31. The HARQ entity may maintain a number of parallel HARQ processes. Each HARQ process may be associated with a HARQ process identifier (ID). The HARQ entity may direct HARQ information and associated TBs received on the DL-SCH to the corresponding HARQ processes. The number of parallel HARQ processes per HARQ entity is specified in 3GPP TS 38.214. The HARQ processes may be DL HARQ processes. The HARQ processes may be used for DL-SCH data reception.

In step 302, the UE 30 may receive a HARQ feedback disabled indication (e.g., downlinkHARQ-FeedbackDisabled) from the BS 31 to disable one or more HARQ process(es). If the HARQ feedback is disabled for the HARQ process, the UE may not generate the ACK/NACK. If the HARQ feedback is disabled for the HARQ process, the MAC layer of the UE may not instruct the PHY layer to generate ACK(s) of the data (in a TB). The HARQ feedback disabled indication may only be configured/indicated for the NTN.

The HARQ feedback disabled indication may be RRC/MAC/PHY signaling. The HARQ feedback disabled indication may be included in the MAC-CellgroupConfig IE, PDCCH-config IE, PDCCH-ServingCellConfig IE, PDSCH-ServingCellConfig IE, ServingCellConfig IE, BWP-DownlinkDedicated IE, PDCCH-config IE, PDSCH-config IE, and/or sps-config IE.

The HARQ feedback disabled indication may indicate HARQ processes for which HARQ feedback is enabled or disabled. The HARQ feedback disabled indication may include a bitmap to indicate HARQ processes for which HARQ feedback is enabled or disabled. Each bit of the bitmap may be associated with one HARQ process. For example, if the bit of the bitmap equals a first value (e.g., '0'), the HARQ feedback of the corresponding HARQ process may be disabled. For example, if the bit of the bitmap equals a second value (e.g., '1'), the HARQ feedback of the corresponding HARQ process may be enabled. The HARQ feedback disabled indication may be denoted as an IE downlinkHARQ-FeedbackDisabled. The HARQ feedback disabled indication (e.g., downlinkHARQ-Feedback-Disabled) may be used to disable the DL HARQ feedback, sent in the uplink, per HARQ process ID. The first/leftmost bit may correspond to HARQ process ID '0,' the next bit may correspond to HARQ process ID '1,' and so on. The bits corresponding to HARQ process IDs that are not configured shall be ignored. The bit(s) set to one identify HARQ processes with disabled DL HARQ feedback and the bit(s) set to zero identify HARQ processes with enabled DL HARQ feedback. The HARQ feedback disabled indication may include a list of HARQ processes for which the HARQ feedback is enabled or disabled. The list of the HARQ processes may be HARQ-FeedbackDisabledList. For example, the list may indicate one or more HARQ process IDs.

In FIG. 2, at step 304, the UE 30 may receive a blind retransmission indication (note that the name of the blind retransmission indication may be changed based on 3GPP progress) from the BS 31. The blind retransmission indication may be used to indicate that the BS may schedule the retransmission (e.g., via PDCCH), no matter whether the HARQ feedback is generated or not. If the UE receives the blind retransmission indication, the UE may assume that the scheduling for DL retransmission, from the BS, is possible after the UE transmits DL data (via new transmission or retransmission), no matter whether the HARQ feedback is generated or not. The blind retransmission indication may be used to indicate that the BS may schedule the retransmission (e.g., via PDCCH) for a HARQ process for which the HARQ feedback is disabled. If the UE receives the blind retransmission indication, the UE may need to monitor PDCCH (e.g., based on a drx retransmission timer) for a possible scheduling for the retransmission, and for a HARQ process for which the HARQ feedback is disabled. The blind retransmission indication may only be configured/indicated for the NTN.

When the blind retransmission is enabled, the UE may not receive two consecutive PDSCHs scheduled for the same HARQ process that cannot ensure UE's processing time. When a blind transmission indication is provided by a DCI format and the receiving timing of the DCI cannot ensure the processing time (e.g., the DCI schedules a PDSCH with a scheduling offset shorter than the minimum time gap between two consecutive PDSCHs), the UE may ignore the PDSCH, or a TB scheduled by the PDCCH. The UE may combine the TB with the previous TB if it is scheduled by the DCI with the blind retransmission indication as enabled. In the other case, the UE may drop the TB if the blind retransmission indication is set to disabled.

The blind retransmission indication may be used to enable/disable the function of the blind retransmission. The blind retransmission indication may be indicated via RRC signaling (e.g., via an IE), MAC signaling (e.g., via MAC CE), and/or PHY signaling (e.g., via a DCI field). The blind retransmission indication may be included in the MAC-CellgroupConfig IE, PDCCH-config IE, PDCCH-Serving-CellConfig IE, PDSCH-ServingCellConfig IE, ServingCell-Config IE, BWP-DownlinkDedicated IE, PDCCH-config IE, PDSCH-config IE, and/or sps-config IE. The blind retransmission indication may be indicated per HARQ process, per MAC entity, per HARQ entity, and/or per UE.

If the blind retransmission indication is indicated per HARQ entity, per MAC entity, and/or per UE, the blind retransmission indication may indicate that the function of the blind transmission may be enabled/disabled for all of the (DL) HARQ process(s) (for which HARQ feedback is disabled) of the HARQ entity/MAC entity/UE. The blind retransmission indication may only have one field/bit to indicate the blind retransmission is enabled or disabled. For example, the field/bit set to a first value may indicate the blind retransmission is enabled. If the UE receives the blind retransmission indication indicating the first value, the UE may assume that the blind retransmission of all HARQ processes (for which HARQ feedback is disabled) is enabled. The field/bit set to a second value may indicate the blind retransmission is disabled. If the UE receives the blind retransmission indication indicating the second value, the UE may assume that the blind retransmission of all HARQ processes (for which HARQ feedback is disabled) is disabled.

If the blind retransmission indication is indicated per HARQ process, the blind retransmission indication may indicate which HARQ process(s) may have an enabled/disabled blind retransmission function. The blind retransmission indication may include a bitmap to indicate the HARQ processes, and each bit of the bitmap may be associated with one HARQ process. For example, if the bit of the bitmap equals a first value (e.g., '0'), the blind retransmission of the corresponding HARQ process may be disabled. If the bit of the bitmap equals a second value (e.g., '1'), the blind retransmission of the corresponding HARQ process may be enabled. The blind retransmission indication may include a list of HARQ processes, and the list may indicate one or more HARQ process IDs.

The UE may determine whether the blind retransmission is enabled or disabled (for a HARQ process) based on whether the blind retransmission indication is configured (for the HARQ process) or not. For example, if the blind retransmission indication is configured for a HARQ process, the UE may consider that the blind retransmission for the HARQ process is enabled. If the blind retransmission indication is not configured for a HARQ process, the UE may consider that the blind retransmission for the HARQ process is disabled.

The UE may determine whether the blind retransmission is enabled or disabled (for a HARQ process) based on the HARQ feedback disabled indication for the HARQ process. If the blind retransmission indication is indicated per HARQ process, the function of the blind retransmission for the HARQ process may be enabled/disabled based on the HARQ feedback disabled indication. If the HARQ feedback of a HARQ process is disabled, the UE may assume that the blind retransmission of the HARQ process is enabled. If the HARQ feedback of a HARQ process is not disabled, the UE may assume that the blind retransmission of the HARQ process is disabled. The UE may determine whether to enable/disable the blind retransmission based on the HARQ feedback disabled indication (e.g., there may be no explicit indication for blind retransmission).

The UE may determine whether the blind retransmission is enabled or disabled (for a HARQ process) based on whether data/a PDU/a TB (for the HARQ process) is successfully decoded. When a (DL) transmission takes place for the HARQ process, the TBs and the associated HARQ information may be received from the HARQ entity. For each received TB and associated HARQ information, the UE may determine whether the (DL) transmission is a new transmission or retransmission. If the (DL) transmission is a new transmission or a retransmission, the UE may attempt to decode the received data. If the data for the received TB has not yet been successfully decoded, the MAC entity may instruct the PHY to combine the received data with the data currently in the soft buffer for this TB and attempt to decode the combined data. The data/PDU/TB may be a MAC PDU.

When a UE receives data/a PDU/a TB for a HARQ process, the UE may attempt to decode the received data/PDU/TB. If the data/PDU/TB for the HARQ process was not successfully decoded, the UE may assume that the blind retransmission for the HARQ process is enabled. The UE may monitor a PDCCH (e.g., based on a drx retransmission timer) for a possible retransmission scheduling for the HARQ process. When a UE receives data/a PDU/a TB for a HARQ process, the UE may attempt to decode the received data/PDU/TB. If the data/PDU/TB for the HARQ process has been successfully decoded, the UE may assume that the blind retransmission for the HARQ process is disabled. The UE may not monitor a PDCCH (e.g., based on a drx retransmission timer) for a possible retransmission scheduling for the HARQ process.

The SPS-Config IE may be used to configure downlink semi-persistent transmission. The blind retransmission indication may be indicated via SPS configuration. The blind retransmission indication indicated via SPS configuration may only be applied for DL semi-persistent transmission(s) which is configured by the SPS configuration.

The UE may determine whether the blind retransmission (for a HARQ process) is enabled/disabled based on the blind retransmission indication included in the SPS configuration after performing a DL transmission (for the HARQ process) which is scheduled by the SPS configuration.

If the UE determines whether the blind retransmission (for a HARQ process) is enabled/disabled based on the blind retransmission indication (for a HARQ process) included in the SPS configuration after performing a DL transmission (for the HARQ process) which is scheduled by the SPS configuration, the UE may ignore the (field of) blind retransmission indication configured by another IE (e.g., the MAC-CellgroupConfig IE, PDCCH-config IE, PDCCH-Serving-CellConfig IE, PDSCH-ServingCellConfig IE, ServingCellConfig IE, BWP-DownlinkDedicated IE, PDCCH-config IE, PDSCH-config IE). The UE may only apply the blind retransmission indication (for a HARQ process) included in the SPS configuration.

If the UE determines whether the blind retransmission (for a HARQ process) is enabled/disabled based on the blind retransmission indication (for a HARQ process) included in an IE (e.g., MAC-CellgroupConfig IE, PDCCH-config IE, PDCCH-ServingCellConfig IE, PDSCH-ServingCellConfig IE, ServingCellConfig IE, BWP-DownlinkDedicated IE, PDCCH-config IE, PDSCH-config IE) after performing a DL transmission (for the HARQ process) which is scheduled by a dynamic scheduling, the UE may ignore the (field of) blind retransmission indication configured in the SPS configuration. The UE may only apply the blind retransmission indication (for a HARQ process) included in the IE (e.g., MAC-CellgroupConfig IE, PDCCH-config IE, PDCCH-ServingCellConfig IE, PDSCH-ServingCellConfig IE, ServingCellConfig IE, BWP-DownlinkDedicated IE, PDCCH-config IE, PDSCH-config IE).

The (DL) SPS may be activated based on a DL assignment (via PDCCH). After a DL assignment is configured for SPS, the UE may consider sequentially that the Nth downlink assignment occurs. The blind retransmission indication may be included in the DL assignment for (activating) SPS. The UE may determine whether the blind retransmission is enabled/disabled based on the blind retransmission indication included in the DL assignment for (activating) SPS. The UE may apply the enabled/disabled blind retransmission based on the DL assignment for (all the) DL semi-persistent transmission(s) which is configured by the SPS.

In step 306 of FIG. 3, while the UE monitors the PDCCH, the UE may receive a DL assignment on the PDCCH (e.g., via C-RNTI). The DL assignment on the PDCCH may include a DCI format (e.g., DCI format 1_0, 1_1, 1_2), an offset K0 (e.g., based on time domain resource assignment), and/or some parameters for the scheduling of the PDSCH (in step 308). The offset K0 may be the slot offset between the DCI/PDCCH and its scheduled PDSCH. The time domain resource assignment may be indicated based on the PDSCH-TimeDomainResourceAllocation IE, which is used to configure a time domain relationship between the PDCCH and the PDSCH. The PDSCH-TimeDomainResourceAllocation-List may contain one or more such PDSCH-TimeDomain-ResourceAllocations. The network may indicate in the DL assignment which of the configured time domain allocations the UE may apply for that DL assignment. The UE may determine the bit width of the DCI field based on the number of entries in the PDSCH-TimeDomainResourceAllocation-List. The value '0' in the DCI field may refer to the first element in this list, the value '1' in the DCI field may refer to the second element in this list, and so on.

In step 308, the UE may be scheduled/indicated/configured to receive a PDSCH. The PDSCH may be scheduled by a dynamic scheduling via the PDCCH (e.g., based on step 306), and/or a SPS.

When the UE receives a PDCCH/DCI indicating a DL transmission/reception for a HARQ process, one or two (in case of downlink spatial multiplexing) TBs and the associated HARQ information may be received. For each received TB and associated HARQ information, the UE may consider this transmission to be a new transmission if the HARQ process is a HARQ process for which the HARQ feedback is disabled and/or the blind retransmission is disabled. The UE may not consider whether this transmission/reception is a new transmission or retransmission based on whether the NDI is toggled or not. In step 310, after receiving the PDCCH and/or the PDSCH, the UE may determine whether to start the timer drx-HARQ-RTT-TimerDL based on the HARQ feedback disabled indication and/or the blind retransmission indication. The HARQ feedback disabled indication may indicate the corresponding HARQ process is disabled. The blind retransmission indication may indicate the corresponding HARQ process is enabled or disabled.

If a PDCCH indicates a DL new transmission or retransmission, the UE may determine whether to start the timer drx-HARQ-RTT-TimerDL based on the HARQ feedback disabled indication and/or the blind retransmission indication.

If data (e.g., MAC PDU) is received in a configured DL assignment (e.g., based on SPS), the UE may determine whether to start the timer drx-HARQ-RTT-TimerDL based on the HARQ feedback disabled indication and/or the blind retransmission indication. If the HARQ feedback disabled indication and/or the blind retransmission indication (for a HARQ process) is not configured, the UE may start the timer drx-HARQ-RTT-TimerDL for the corresponding HARQ process (in the first symbol after the end of the corresponding transmission carrying the DL HARQ feedback). If the HARQ feedback disabled indication and/or the blind retransmission indication (for a HARQ process) is not configured, the UE may stop the timer drx-Retransmission-TimerDL for the corresponding HARQ process. Otherwise, the UE may not stop the timer drx-RetransmissionTimerDL.

If the HARQ feedback disabled indication and/or the blind retransmission indication (for a HARQ process) is configured, the UE may not start the timer drx-HARQ-RTT-TimerDL for the corresponding HARQ process (in the first symbol after the end of the corresponding transmission carrying the DL HARQ feedback). The HARQ feedback disabled indication may indicate the corresponding HARQ process is disabled. The blind retransmission indication may indicate the corresponding HARQ process is enabled or disabled. If the HARQ feedback disabled indication and/or the blind retransmission indication (for a HARQ process) is configured, the UE may stop the timer drx-HARQ-RTT-TimerDL for the corresponding HARQ process (e.g., if the timer drx-HARQ-RTT-TimerDL is running). If the HARQ feedback disabled indication and/or the blind retransmission indication (for a HARQ process) is configured, the UE may (re-)start and/or stop the timer drx-RetransmissionTimerDL for the corresponding HARQ process.

If the HARQ feedback (of a HARQ process) is disabled, the UE may not start the timer drx-HARQ-RTT-TimerDL for the corresponding HARQ process (in the first symbol after the end of the corresponding transmission carrying the DL HARQ feedback). If the HARQ feedback (of a HARQ process) is disabled, the UE may stop the timer drx-HARQ-RTT-TimerDL for the corresponding HARQ process (e.g., if the timer drx-HARQ-RTT-TimerDL is running). If the HARQ feedback (of a HARQ process) is disabled, the UE may (re-)start and/or stop the timer drx-RetransmissionTim-erDL (if running) for the corresponding HARQ process. If the HARQ feedback (of a HARQ process) is disabled, the UE may (re-)start and/or stop the timer drx-Retransmission-TimerDL immediately, or next time while the HARQ process is applied, or in the next DRX cycle.

If the UE does not generate/carry/transmit a (DL) HARQ feedback for a HARQ process, the UE may not start the timer drx-HARQ-RTT-TimerDL for the corresponding HARQ process (in the first symbol after the end of the corresponding transmission carrying the DL HARQ feedback). If the UE does not generate/carry/transmit a (DL) HARQ feedback for a HARQ process, the UE may stop the timer drx-HARQ-RTT-TimerDL for the corresponding HARQ process (e.g., if the timer drx-HARQ-RTT-TimerDL is running). If the UE does not generate/carry/transmit a (DL) HARQ feedback for a HARQ process, the UE may (re-)start and/or stop the timer drx-RetransmissionTimerDL for the corresponding HARQ process.

If the HARQ feedback disabled indication and/or the blind retransmission indication (for a HARQ process) is configured, the timer drx-HARQ-RTT-TimerDL and/or the timer drx-RetransmissionTimerDL may be disabled/absent and/or not configured. If the HARQ feedback disabled indication and/or the blind retransmission indication (for a HARQ process) is configured, the timer drx-HARQ-RTT-TimerDL may be set/configured as value '0.' The HARQ feedback disabled indication may indicate the corresponding HARQ process is disabled. The blind retransmission indi-cation may indicate the corresponding HARQ process is enabled or disabled.

If the HARQ feedback of a HARQ process is disabled, the timer drx-HARQ-RTT-TimerDL and/or the timer drx-Re-transmissionTimerDL may be disabled/absent and/or not configured. If the HARQ feedback of a HARQ process is disabled, the timer drx-HARQ-RTT-TimerDL may be set/configured as value '0.'

In steps 312 to 318 of FIG. 3, the UE may determine how/when to monitor the PDCCH for receiving the possible DL (blind) retransmission. The UE may monitor the PDCCH discontinuously using the DRX operation. The UE/MAC entity may be configured by an RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI.

When the UE receives a PDCCH/DCI indicating a DL transmission/reception for a HARQ process, one or two (in case of downlink spatial multiplexing) TBs and the associated HARQ information may be received. The UE may consider this transmission as a new transmission or a retransmission based on whether the NDI (provided by the PDCCH/DCI) has been toggled (compared to the value of the previous received transmission corresponding to this TB) or not.

If this transmission is a retransmission, the UE may determine whether to ignore the scheduling information (e.g., HARQ information) for data/a TB based on whether the data/TB is stored in the HARQ buffer of the corresponding HARQ process and/or whether the HARQ buffer is empty. If no data/TB is stored in the HARQ buffer (e.g., the HARQ buffer is empty), the UE may ignore the scheduling information and/or the data/TB. If the data/TB is stored in the HARQ buffer (e.g., the HARQ buffer is not empty), the MAC entity may instruct the physical layer to combine the received data with the data currently in the HARQ buffer for this TB and attempt to decode the combined data.

If this transmission is a retransmission, the UE may determine whether to ignore the scheduling information (e.g., HARQ information) for data/TB based on whether the data/TB was successfully decoded before or not. If the data/TB was successfully decoded before, the UE may ignore the scheduling information and/or the data/TB.

A timer may be used for the PDCCH monitoring (for receiving the DL (blind) retransmission). The UE may consider a time while the timer is running as the (DRX) Active Time. While the timer is running, and/or the UE considers the current time as Active Time (based on the timer), the UE may monitor the PDCCH (on the serving cells in this DRX group as specified in 3GPP TS 38.213). The timer may be a new timer for monitoring the PDCCH for blind retransmission. The timer may be only configured for the NTN. The timer may be at least one of a new (drx) timer, a drx-onDurationTimer, a drx-InactivityTimer, a drx-RetransmisionTimerDL, a drx-RetransmissionTimerUL, a configuredGrantTimer, a cg-RetransmissionTimer, a spsTimer, a sps-RetransmissionTimer, a drx-HARQ-RTT-TimerDL, and a drx-HARQ-RTT-TimerUL.

The length of time associated with the timer may be the maximum duration until a DL retransmission is received. The timer may be associated with a HARQ process (for which HARQ feedback is disabled and/or the blind retrans-mission is enabled). The timer may be applied (e.g., (re-) start the timer, stop the timer, and/or perform UE actions upon the timer expiring) based on the HARQ feedback disabled indication and/or the blind retransmission indica-tion. The timer may be applied (e.g., (re-)start the timer, stop the timer, and/or perform UE actions upon the timer expir-ing) if the HARQ feedback disabled indication and/or the blind retransmission indication (for a HARQ process) is configured. The HARQ feedback disabled indication may indicate the corresponding HARQ process is disabled. The blind retransmission indication may indicate the correspond-ing HARQ process is enabled. The timer may be applied (e.g., (re-)start the timer, stop the timer, and/or perform UE actions upon the timer expiring) if the HARQ feedback (of the HARQ process) is disabled. The timer may be applied (e.g., (re-)start the timer, stop the timer, and/or perform UE actions upon the timer expiring) if the blind retransmission (of the HARQ process) is enabled. The timer may be applied (e.g., (re-)start the timer, stop the timer, and/or perform UE actions upon the timer expiring) if the UE does not generate/ carry/transmit a (DL) HARQ feedback for a HARQ process.

The timer may be applied (e.g., (re-)start the timer, stop the timer, and/or perform UE actions upon the timer expir-ing) if the UE does not start the timer drx-HARQ-RTT-TimerDL for the HARQ process. The timer may be applied (e.g., (re-)start the timer, stop the timer, and/or perform UE actions upon the timer expiring) if the timer drx-HARQ-RTT-TimerDL is disabled/absent and/or not configured. The timer may be applied (e.g., (re-)start the timer, stop the timer, and/or perform UE actions upon the timer expiring) if the timer drx-HARQ-RTT-TimerDL is set/configured as value '0.'

The offset and/or the second timer may be indicated by K0. The offset and/or the second timer may be determined from N1 processing time. The N1 processing time may be derived based on the UE processing capability. N1 may be the UE processing time for PDSCH in general. N1 may be based on UE processing capability reported to the NW via an RRC message and may be based on subcarrier spacing (SCS), where the SCS corresponds to an SCS among PDCCH, PDSCH, and UL channel for HARQ-ACK that results in the largest value of N1. The length of time associated with the offset and/or the second timer may be the minimum duration before a DL assignment for HARQ retransmission is expected by the UE/MAC entity. The offset and/or the second timer may be defined from the end of the reception of the last PDSCH or slot-aggregated PDSCH for a given HARQ process with disabled feedback to the start of the DCI scheduling another PDSCH or set of slot-aggregated PDSCH for the given HARQ process. The offset and/or the second timer may be defined from the end of the reception of the last PDSCH or slot-aggregated PDSCH for a given HARQ process with disabled feedback to the start of another PDSCH or set of slot-aggregated PDSCH for the given HARQ process.

In the following, HARQ feedback for Msg4/MsgB is described.

In 5G NR, the following two types (a) and (b) of random access procedure are supported. (a) 4-step RA type (with Msg1, Msg2, Msg3, and/or Msg4) (e.g., CFRA and/or 4-step CBRA). (b) 2-step RA type (with MsgA, and/or MsgB) (e.g., 2-step CFRA and/or 2-step CBRA). The Msg1 may be a preamble transmission of the RA procedure for RA procedure with 4-step type. The Msg 2 may be a random access response (RAR) of the RA procedure for 4-step RA type. The RAR may be a response to Msg1 in the 4-step RA procedure. The Msg3 may be a message transmitted on UL-SCH containing a C-RNTI MAC CE or CCCH SDU, submitted from upper layer and associated with the UE Contention Resolution Identity, as part of the 4-step random access procedure. The Mgs4 may be a PDCCH transmission for the contention resolution in the 4-step RA procedure. If the UE considers the contention resolution of the RA procedure to be successful, the UE may consider the RA procedure successfully completed. The MsgA may be preamble and payload transmissions of the RA procedure for the 2-step RA type. The MsgB may be a response to MsgA in the 2-step RA procedure. The MsgB may include response(s) for contention resolution, fallback indication(s), and/or backoff indication.

In some implementations, the UE may transmit HARQ feedback for the MAC PDU including UE CRID MAC CE based on some information (e.g., HARQ process number, ChannelAccess-CPext, TPC, TPC command for scheduled PUCCH, HARQ feedback timing indicator, PDSCH-to-HARQ_feedback timing indicator, PUCCH resource indicator, etc.) indicated by the PDCCH/DCI (e.g., DCI format 1_0) for the Msg4 which transmits the MAC PDU including UE CRID MAC CE.

In response to a PUSCH transmission scheduled by a RAR UL grant when a UE has not been provided with a C-RNTI, the UE may attempt to detect a DCI format 1_0 with CRC scrambled by a corresponding TC-RNTI scheduling a PDSCH that includes a UE contention resolution identity. In response to the PDSCH reception with the UE contention resolution identity, the UE may transmit HARQ-ACK information in a PUCCH. The PUCCH transmission may be within a same active UL BWP as the PUSCH transmission. The Msg4 may be received, from the NW, based a PDCCH transmission while the timer ra-ContentionResolutionTimer is running. The Msg 4 may be received on a PDSCH that includes a UE contention resolution identity. The Msg4 may be received in response to a PUSCH transmission scheduled by a RAR UL grant (e.g., Msg3).

In some implementations, the UE may transmit HARQ feedback for the MAC PDU including UE CRID MAC CE based on some information (e.g., HARQ process number, ChannelAccess-CPext, TPC, TPC command for scheduled PUCCH, HARQ feedback timing indicator, PDSCH-to-HARQ_feedback timing indicator, PUCCH resource indicator, etc.) indicated by the successRAR MAC subPDU for the MsgB which transmits the MAC PDU including UE CRID MAC CE. The MsgB may be received, from the NW, based a PDCCH transmission while the msgB-Response-Window is running. The MsgB may be received on a PDSCH that includes a UE contention resolution identity. The MsgB may be received in response to a MsgA transmission. The MsgB may contain a successRAR MAC subPDU. The Msg4 and/or MsgB may indicate PDSCH reception with the UE contention resolution identity.

In some implementations, the HARQ feedback (for DL) (e.g., for a HARQ process) may be disabled (e.g., by an RRC configuration from the NW). If the HARQ feedback (for a HARQ process) is disabled, the UE may not need to transmit a HARQ feedback (for the HARQ process). The UE may transmit a HARQ feedback (e.g., HARQ-ACK information/positive acknowledgement) in response to PDSCH reception with the UE contention resolution identity regardless of whether the HARQ feedback is disabled or not. The UE may transmit a HARQ feedback (e.g., HARQ-ACK information/positive acknowledgement) in response to PDSCH reception with the UE contention resolution identity even if the HARQ feedback for the UE is disabled. The UE may transmit a HARQ feedback (e.g., HARQ-ACK information/positive acknowledgement) in response to PDSCH reception with the UE contention resolution identity even if the HARQ feedback for a HARQ process is disabled, wherein the HARQ process may be a HARQ process indicated by the PDCCH for the PDSCH reception with the UE contention resolution identity.

In some implementations, the UE may determine whether to transmit a HARQ feedback (e.g., HARQ-ACK information/positive acknowledgement) in response to PDSCH reception with the UE contention resolution identity (e.g., Msg4) based on at least one field indicated by a PDCCH which schedules the PDSCH with the UE contention resolution identity. The PDCCH may be a DCI format 1_0 (with CRC scrambled by a corresponding RC-RNTI). The at least one field indicated by a PDCCH which schedules the PDSCH with the UE contention resolution identity may be at least one field/information transmitted by means of the DCI format 1_0 (e.g., at least one of a specific indication, NDI, RV, HARQ process number, downlink assignment index, TPC command for scheduled PUCCH, PUCCH resource indicator, PDSCH-to-HARQ_feedback timing indicator, and ChannelAccess-CPext). A specific field (indicated by a PDCCH which schedules the PDSCH with the UE contention resolution identity) may be used to indicate to the UE whether to transmit a HARQ feedback (e.g., HARQ-ACK information/positive acknowledgement) in response to PDSCH reception with the UE contention resolution identity (e.g., Msg4).

If the HARQ process number (indicated by a PDCCH which schedules the PDSCH with the UE contention resolution identity) indicates a HARQ process ID for which the HARQ feedback is disabled, the UE may not transmit a HARQ feedback (e.g., HARQ-ACK information/positive acknowledgement) in response to PDSCH reception with the UE contention resolution identity. If the HARQ process number (indicated by a PDCCH which schedules the PDSCH with the UE contention resolution identity) indicates a HARQ process ID for which the HARQ feedback is disabled, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s). If the HARQ process number (indicated by a PDCCH which schedules the PDSCH with the UE contention resolution identity) indicates a HARQ process ID for which the HARQ feedback is disabled, the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

If the PDCCH/DCI (which schedules the PDSCH with the UE contention resolution identity) is scrambled by a specific RNTI, at least one field/information may be absent or not configured (e.g., at least one of NDI, RV, HARQ process number, downlink assignment index, TPC command for scheduled PUCCH, PUCCH resource indicator, PDSCH-to-HARQ_feedback timing indicator, and ChannelAccess-CPext). If the NW would disable the HARQ feedback for the PDSCH reception with the UE contention resolution identity, the PDCCH for the PDSCH reception with the UE contention resolution identity should be scrambled by the specific RNTI (e.g., which is not the C-RNTI or TC-RNTI).

If at least one field/information included in the PDCCH which schedules the PDSCH with the UE contention resolution identity is absent or not configured, the UE may not transmit a HARQ feedback (e.g., HARQ-ACK information/positive acknowledgement) in response to PDSCH reception with the UE contention resolution identity. The at least one field/information included in the PDCCH which schedules the PDSCH with the UE contention resolution identity may be at least one of NDI, RV, HARQ process number, downlink assignment index, TPC command for scheduled PUCCH, PUCCH resource indicator, PDSCH-to-HARQ_feedback timing indicator, and ChannelAccess-CPext.

In some implementations, the UE may determine whether to transmit a HARQ feedback (e.g., HARQ-ACK information/positive acknowledgement) in response to PDSCH reception with the UE contention resolution identity (e.g., MsgB) based on at least one field of the successRAR MAC subPDU for the MsgB, wherein the MsgB is scheduled by a PDCCH. The PDCCH may be a DCI format 1_0 (with CRC scrambled by a corresponding MsB-RNTI). A new field (e.g., using a reserved bit) of the success RAR MAC subPDU may be used to indicate to the UE whether to transmit a HARQ feedback (e.g., HARQ-ACK information/positive acknowledgement) in response to PDSCH reception with the UE contention resolution identity (e.g., MsgB). The at least one field of the successRAR MAC subPDU for the MsgB may be at least one field/information (e.g., at least one of ChannelAccess-CPext, TPC, HARQ Feedback Timing Indicator, and PUCCH Resource Indicator). A specific field (indicated by a PDCCH which schedules the PDSCH with the UE contention resolution identity and/or by the successRAR MAC subPDU) may be used to indicate to the UE whether to transmit a HARQ feedback (e.g., HARQ-ACK information/positive acknowledgement) in response to PDSCH reception with the UE contention resolution identity (e.g., MsgB).

In some implementations, if the HARQ process number (indicated by a PDCCH which schedules the PDSCH with the UE contention resolution identity and/or by the successRAR MAC subPDU) indicates a HARQ process ID for which the HARQ feedback is disabled, the UE may not transmit a HARQ feedback (e.g., HARQ-ACK information/positive acknowledgement) in response to PDSCH reception with the UE contention resolution identity.

If the HARQ process number (indicated by a PDCCH which schedules the PDSCH with the UE contention resolution identity and/or by the successRAR MAC subPDU) indicates a HARQ process ID for which the HARQ feedback is disabled, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

If the HARQ process number (indicated by a PDCCH which schedules the PDSCH with the UE contention resolution identity and/or by the successRAR MAC subPDU) indicates a HARQ process ID for which the HARQ feedback is disabled, the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

In some implementations, if the PDCCH/DCI (which schedules the PDSCH with the UE contention resolution identity) is scrambled by a specific RNTI, at least one field/information of the successRAR MAC subPDU for the MsgB may be absent or not configured (e.g., at least one of ChannelAccess-CPext, TPC, HARQ Feedback Timing Indicator, and PUCCH Resource Indicator). If the NW would disable the HARQ feedback for the PDSCH reception with the UE contention resolution identity, the PDCCH for the PDSCH reception with the UE contention resolution identity should be scrambled by the specific RNTI (e.g., which is not the MsgB-RNTI).

In some implementations, if at least one field/information included in the successRAR MAC subPDU is absent or not configured, the UE may not transmit a HARQ feedback (e.g., HARQ-ACK information/positive acknowledgement) in response to PDSCH reception with the UE contention resolution identity. The at least one field/information included in the successRAR MAC subPDU may be at least one of ChannelAccess-CPext, TPC, HARQ Feedback Timing Indicator, and PUCCH Resource Indicator.

If the UE is not expected to transmit a HARQ feedback in response to PDSCH reception with the UE contention resolution identity (e.g., MsgB) based on the circumstances mentioned in the present disclosure, the MAC entity of the UE may not deliver the TPC, PUCCH resource Indicator, ChannelAccess-CPext (if indicated), and HARQ feedback Timing Indicator (received in successRAR) to lower layers/PHY. If the UE is expected to transmit a HARQ feedback in response to PDSCH reception with the UE contention resolution identity (e.g., MsgB) based on the circumstances mentioned in the present disclosure, the MAC entity of the UE may deliver the TPC, PUCCH resource Indicator, ChannelAccess-CPext (if indicated), and HARQ feedback Timing Indicator (received in successRAR) to lower layers/PHY.

In some implementations, for the PDSCH reception with the UE contention resolution identity (e.g., Msg4/MsgB), a specific HARQ process identifier may be used (e.g., HARQ process identifier 0 or the largest number of the HARQ process). The UE may use the HARQ buffer of the specific HARQ process identifier to receive the PDSCH with the UE contention resolution identity (e.g., Msg4/MsgB). The HARQ feedback of the specific HARQ process may be enabled or not disabled. The specific HARQ process may not be allowed to disable the HARQ feedback.

In some implementations, the UE may determine whether to transmit a HARQ feedback (e.g., HARQ-ACK information/positive acknowledgement) in response to PDSCH reception with the UE contention resolution identity based on whether the HARQ feedback is disabled.

If the HARQ feedback for the UE is disabled, the UE may not transmit a HARQ feedback (e.g., HARQ-ACK information/positive acknowledgement) in response to PDSCH reception with the UE contention resolution identity. If the HARQ feedback for the UE is disabled, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ_ feedback timing indicator field, and the ChannelAccess-CPex field(s). If the HARQ feedback for the UE is disabled, the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s). If the HARQ feedback for the UE is disabled, the UE may not be indicated to transmit the PUCCH with the HARQ-ACK information.

If the HARQ feedback for a HARQ process is disabled, wherein the HARQ process may be a HARQ process indicated by the PDCCH for the PDSCH reception with the UE contention resolution identity, the UE may not transmit a HARQ feedback (e.g., HARQ-ACK information/positive acknowledgement) in response to PDSCH reception with the UE contention resolution identity. If the HARQ feedback for a HARQ process is disabled, wherein the HARQ process may be a HARQ process indicated by the PDCCH for the PDSCH reception with the UE contention resolution identity, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the HARQ feedback for a HARQ process is disabled, the UE may not be indicated to transmit the PUCCH with the HARQ-ACK information for the HARQ process. If the HARQ feedback for a HARQ process is disabled, wherein the HARQ process may be a HARQ process indicated by the PDCCH for the PDSCH reception with the UE contention resolution identity, the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

In some implementations, the UE may determine whether to transmit a HARQ feedback (e.g., HARQ-ACK information/positive acknowledgement) in response to PDSCH reception with the UE contention resolution identity based on an indication indicated by the NW. The indication may indicate that the HARQ feedback for the PDSCH reception with the UE contention resolution identity is enabled/disabled.

If the indication indicates that the HARQ feedback for the PDSCH reception with the UE contention resolution identity is enabled, the UE may transmit a HARQ feedback (e.g., HARQ-ACK information/positive acknowledgement) in response to PDSCH reception with the UE contention resolution identity.

If the indication indicates that the HARQ feedback for the PDSCH reception with the UE contention resolution identity is disabled, the UE may not provide a HARQ feedback (e.g., HARQ-ACK information/positive acknowledgement) in response to PDSCH reception with the UE contention resolution identity. If the indication indicates that the HARQ feedback for the PDSCH reception with the UE contention resolution identity is disabled, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s). If the indication indicates that the HARQ feedback for the PDSCH reception with the UE contention resolution identity is disabled, the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

The indication may be RRC/MAC/PHY signaling. The indication may be indicated by the PDCCH for the PDSCH reception with the UE contention resolution identity. The indication may be included in a IE (e.g., MAC-Cellgroup-Config IE, PDCCH-config IE, PDCCH-ServingCellConfig IE, PDSCH-ServingCellConfig IE, ServingCellConfig IE, BWP-DownlinkDedicated IE, PDCCH-config IE, PDSCH-config IE, RACH-ConfigCommon IE, RACH-ConfigCommonTwoStepRA IE, RACH-ConfigDedicated IE, RACH-ConfigGeneric IE, and RACH-ConfigGenericTwoStepRA IE). The indication may be referred to as a HARQ feedback disabled indication. The indication may indicate a specific HARQ process (e.g., HARQ process ID 0 and/or the largest number of the HARQ process ID). The indication may indicate a specific HARQ process, wherein the HARQ feedback of the specific HARQ process is enabled or not disabled. The specific HARQ process may not be allowed to disable the HARQ feedback. The indication may indicate the information of HARQ process number.

In some implementations, the UE may determine whether to transmit a HARQ feedback (e.g., HARQ-ACK information/positive acknowledgement) in response to PDSCH reception with the UE contention resolution identity based on a specific HARQ process.

If the UE is indicated with the specific HARQ process (by the PDCCH for the PDSCH reception with the UE contention resolution identity), the UE may transmit a HARQ feedback (e.g., HARQ-ACK information/positive acknowledgement) in response to PDSCH reception with the UE contention resolution identity.

If the UE is not indicated with the specific HARQ process (by the PDCCH for the PDSCH reception with the UE contention resolution identity), the UE may not transmit a HARQ feedback (e.g., HARQ-ACK information/positive acknowledgement) in response to PDSCH reception with the UE contention resolution identity. If the UE is not indicated with the specific HARQ process (by the PDCCH for the PDSCH reception with the UE contention resolution identity), the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s). If the UE is not indicated with the specific HARQ process (by the PDCCH for the PDSCH reception with the UE contention resolution identity), the UE may consider at least one field included in the PDCCH for PDSCH reception with the UE contention resolution identity to be absent. The at least one field included in the PDCCH for PDSCH reception with the UE contention resolution identity may be at least one of the TPC command for scheduled PUCCH field, the PUCCH resource indication field, the PDSCH-to-HARQ_feedback timing indicator field, and the ChannelAccess-CPex field(s).

The specific HARQ process may be a HARQ process which should not be disabled the corresponding HARQ feedback. Specifically, the NW may not disable the HARQ feedback of the HARQ process. The specific HARQ process may be associated with a specific identifier of the HARQ process (e.g., HARQ process ID 0 and/or the largest number of the HARQ process ID).

In some implementations, the UE may transmit HARQ-ACK information in a PUCCH in response to the PDSCH reception with the UE contention resolution identity if the associated HARQ feedback is not disabled and if a time gap between the last symbol of the PDSCH reception and the first symbol of the corresponding PUCCH transmission with the HARQ-ACK information is equal to or greater than N1+0.5 milliseconds (msec), where N1 corresponds to UE processing capability.

On the basis of 3GPP TS 38.321, when the UE receives a Timing Advance (TA) Command in a Random Access Response (RAR) message for a serving cell belonging to a TAG or in a MsgB for an SpCell, and if the timer time-AlignmentTimer (e.g., TA timer) associated with the TAG is not running, the UE may start the timer timeAlignment-Timer associated with the TAG. After that, when the UE considers the Contention Resolution to be successful for SI request, after transmitting HARQ feedback for a MAC PDU including UE Contention Resolution Identity (UE CRID) MAC CE, the UE may stop the timer timeAlignmentTimer associated with the TAG. The MAC PDU including UE Contention Resolution Identity MAC CE may be received, from the NW, based on a PDCCH for a Msg4/MsgB (e.g., after Msg3/MsgA is transmitted by the UE).

In some implementations, the HARQ feedback (for DL) (e.g., for a HARQ process) may be disabled (e.g., by an RRC configuration from the NW). If the HARQ feedback (for a HARQ process) is disabled, the UE may not need to transmit a HARQ feedback (for the HARQ process). If the UE is not expected to transmit a HARQ feedback in response to PDSCH reception with the UE contention resolution identity (e.g., a MAC PDU including UE Contention Resolution Identity (UE CRID) MAC CE), based on the circumstances mentioned in the present disclosure (e.g., the HARQ feedback for PDSCH reception with the UE contention resolution identity is disabled), the UE may stop the timer time-AlignmentTimer when the UE considers the Contention Resolution to be successful for SI request (e.g., without transmitting HARQ feedback for a MAC PDU including UE Contention Resolution Identity (UE CRID) MAC CE).

In some implementations, if the UE is not expected to transmit a HARQ feedback in response to PDSCH reception with the UE contention resolution identity (e.g., a MAC PDU including UE Contention Resolution Identity (UE CRID) MAC CE), based on the circumstances mentioned in the present disclosure (e.g., the HARQ feedback for PDSCH reception with the UE contention resolution identity is disabled), the UE may not stop the timer timeAlignment-Timer when the UE considers the Contention Resolution to be successful for SI request.

Downlink assignments received on the PDCCH both indicate that there is a transmission on a DL-SCH for a particular MAC entity and provide the relevant HARQ information. The MAC entity may include a HARQ entity for each serving cell, which maintains a number of parallel HARQ processes. Each HARQ process may be associated with a HARQ process identifier. The HARQ entity may direct HARQ information and associated TBs received on the DL-SCH to the corresponding HARQ processes. The number of parallel DL HARQ processes per HARQ entity may be specified in 3GPP TS 38.214. The dedicated broadcast HARQ process may be used for BCCH. The HARQ process may support one TB when the physical layer is not configured for downlink spatial multiplexing. The HARQ process may support one or two TBs when the physical layer is configured for downlink spatial multiplexing.

If a downlink assignment has been indicated, the MAC entity may allocate the TB(s) received from the physical layer and the associated HARQ information to the HARQ process indicated by the associated HARQ information. If a downlink assignment has been indicated for the broadcast HARQ process, the MAC entity may allocate the received TB to the broadcast HARQ process.

The uplink grant may be either received dynamically on the PDCCH, in a Random Access Response, configured semi-persistently by RRC, or determined to be associated with the PUSCH resource of MsgA, as specified in 3GPP TS 38.321. The MAC entity may have an uplink grant to transmit on the UL-SCH. To perform the requested transmissions, the MAC layer receives HARQ information from lower layers. An uplink grant addressed to CS-RNTI with NDI=0 may be considered as a configured uplink grant. An uplink grant addressed to CS-RNTI with NDI=1 may be considered as a dynamic uplink grant.

The MAC entity may include a HARQ entity for each serving cell with configured uplink (including the case when it is configured with supplementaryUplink), which maintains a number of parallel HARQ processes. The number of parallel UL HARQ processes per HARQ entity may be specified in 3GPP TS 38.214. Each HARQ process may support one TB. Each HARQ process may be associated with a HARQ process identifier. For UL transmission with UL grant in RA Response or for UL transmission for MsgA payload, HARQ process identifier 0 may be used. When a single DCI is used to schedule multiple PUSCH, the UE may be allowed to map generated TB(s) internally to different HARQ processes in case of LBT failure(s). For example, the UE may transmit a new TB on any HARQ process in the grants that have the same TBS, the same RV and the NDIs indicate new transmission.

FIG. 4 is a flowchart illustrating a method 400 for a UE for performing a hybrid automatic repeat request (HARQ) operation according to an example implementation of the present disclosure. Although actions 402 and 404 are illustrated as separate actions represented as independent blocks in FIG. 4, these separately illustrated actions should not be construed as necessarily order dependent. The order in which the actions are performed in FIG. 4 is not intended to be construed as a limitation, and any number of the disclosed blocks may be combined in any order to implement the method, or an alternate method. Moreover, each of actions 402 and 404 may be performed independently of other actions and can be omitted in some implementations of the present disclosure.

In action 402, the UE may receive, from a Base Station (BS), a first configuration for a serving cell, the first configuration including a first bitmap for indicating a HARQ mode of each HARQ process in a first HARQ process set. Each bit in the first bitmap may be associated with a corresponding HARQ process in the first HARQ process set. The first HARQ mode may be denoted as HARQ Mode A and the second HARQ mode may be denoted as HARQ Mode B. The first configuration may be included in a Physical Uplink Shared Channel (PUSCH) configuration for the serving cell.

In action 404, the UE may identify, based on the first bitmap, whether each HARQ process in the first HARQ process set is related to a first HARQ mode or a second HARQ mode.

In some implementations, the UE may identify, based on a bit in the first bitmap, that a HARQ process in the first HARQ process set is related to the first HARQ mode in a case that the bit indicates a first value, and may identify, based on the bit in the first bitmap, that the HARQ process in the first HARQ process set is related to the second HARQ mode in a case that the bit indicates a second value, and ignore the bit in the first bitmap in a case that the bit is not configured with a value.

In some implementations, the UE may receive, from the BS, a logical channel configuration including a parameter, and the parameter may indicate that at least one of the first HARQ mode and the second HARQ mode are allowed to be mapped to a logical channel. The UE may receive, from the BS, an uplink (UL) grant indicating a HARQ process in the first HARQ process set, perform a transmission for the HARQ process via the UL grant based on a Logical Channel Prioritization (LCP) procedure, and determine whether the logical channel is allowed to be selected for the transmission based on the parameter and the HARQ mode of the HARQ process.

In some implementations, the UE may set a value of a timer for a HARQ process in the first HARQ process set in a case that the HARQ process is related to the first HARQ mode. The value may be a sum of a first value and a second value, the first value may be configured by a Discontinuous Reception (DRX) configuration received from the BS, the second value may correspond to a Round Trip Time (RTT), and the RTT may be derived by a Timing Advance (TA) value and a scheduling offset.

In some implementations, the UE may receive, from the BS, a second configuration for the serving cell, the second configuration including a second bitmap for indicating a Downlink (DL) HARQ feedback condition of each HARQ process in a second HARQ process set, and the UE may identify, based on the second bitmap, whether each HARQ process in the second HARQ process set is related to a first DL HARQ feedback condition or a second DL HARQ feedback condition. Each bit in the second bitmap may be associated with a corresponding HARQ process in the second HARQ process set. The first DL HARQ feedback condition may be denoted as HARQ feedback for a HARQ process in the second HARQ process set being enabled and the second DL HARQ feedback condition may be denoted as HARQ feedback for the HARQ process in the second HARQ process set being disabled. The second configuration may be included in a Physical Downlink Shared Channel (PDSCH) configuration for the serving cell.

In the present disclosure, a UE can be configured with different HARQ modes for different HARQ processes. The UE may perform different transmission behaviors based on the different HARQ modes. The HARQ mode of each HARQ process can be configured via a bitmap. All HARQ processes can be indicated as one of the HARQ modes by one single configuration; thus, the signaling overhead can be reduced.

Figure 5:
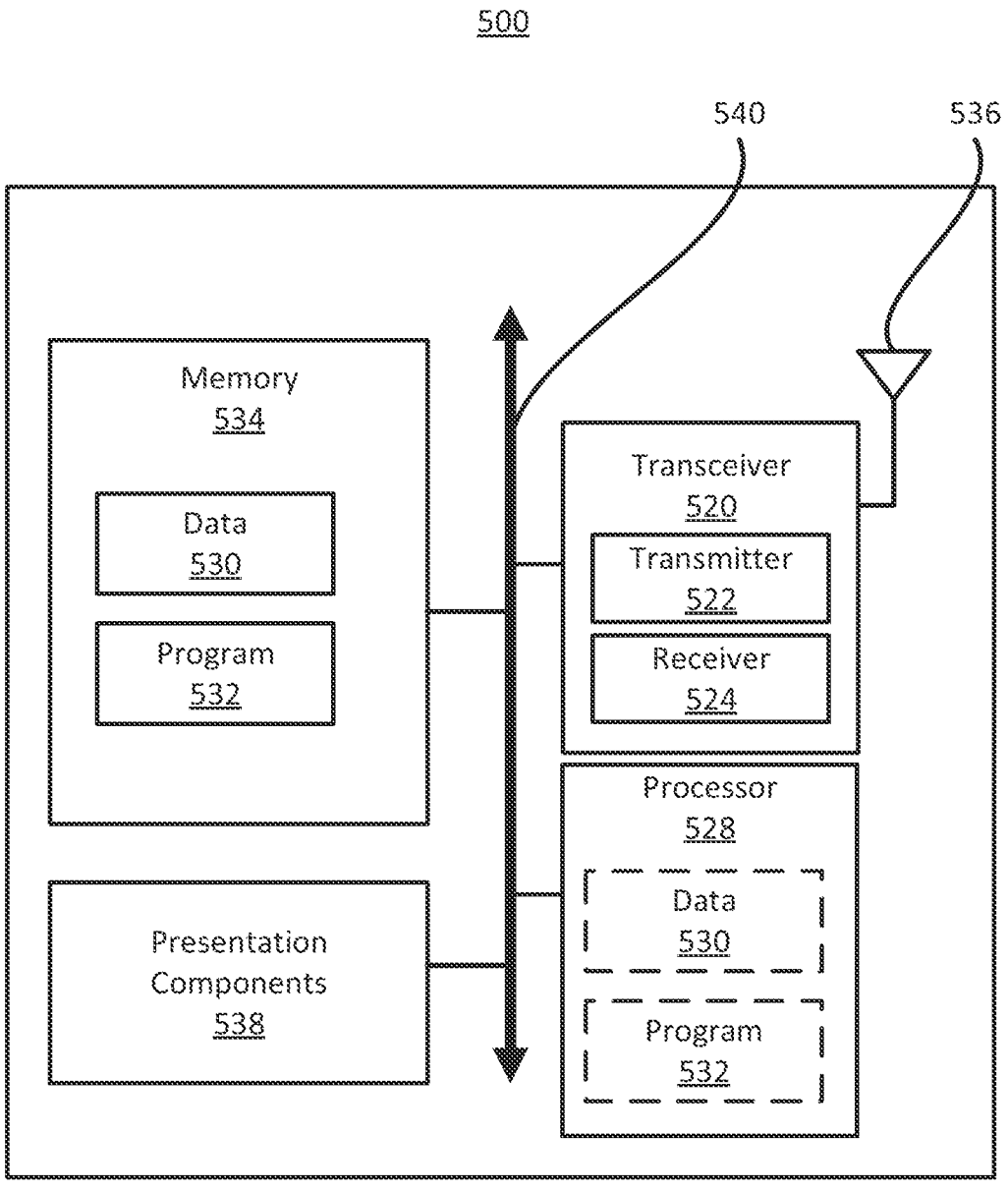
FIG. 5 is a block diagram illustrating a node for wireless communication, according to an example implementation of the present disclosure.

FIG. 5 is a block diagram illustrating a node 500 for wireless communication according to an example implementation of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 540. The node 500 may be a UE or a BS that performs various functions disclosed with reference to FIG. 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable, and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable program 532 (e.g., software codes) that are configured to, when executed, cause the processor 528 to perform various functions disclosed herein, for example, with reference to FIG. 4. Alternatively, the program 532 may not be directly executable by the processor 528 but may be configured to cause the node 500 (e.g., when compiled and executed) to perform various functions disclosed herein.

The processor 528 (e.g., having processing circuitry) may include an intelligent hardware device (e.g., a Central Processing Unit (CPU), a microcontroller, an ASIC, etc). The processor 528 may include memory. The processor 528 may process the data 530 and the program 532 received from the memory 534, and information transmitted and received via the transceiver 520, the base band communications module, and/or the network communications module. The processor 528 may also process information to send to the transceiver 520 for transmission via the antenna 536 to the network communications module for transmission to a CN.

One or more presentation components 538 may present data indications to a person or another device. Examples of presentation components 538 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a User Equipment (UE) for performing a Hybrid Automatic Repeat Request (HARQ) mode operation in a non-terrestrial network (NTN), the method comprising:
   receiving, from a Base Station (BS), a first configuration and a second configuration for a serving cell, the first configuration including a first bitmap for indicating a HARQ mode of each uplink (UL) HARQ process in a UL HARQ process set, each bit in the first bitmap being associated with a corresponding UL HARQ process in the UL HARQ process set, and the second configuration including a second bitmap for indicating a Downlink (DL) HARQ feedback condition of each DL HARQ process in a DL HARQ process set, each bit in the second bitmap being associated with a corresponding DL HARQ process in the DL HARQ process set;
   identifying, based on the first bitmap, whether the HARQ mode of each UL HARQ process in the UL HARQ process set is related to a first HARQ mode, in which a HARQ Round Trip Time (RTT) timer for the UL HARQ process is set and started by the UE, or a second HARQ mode, in which the HARQ RTT timer for the UL HARQ process is not started by the UE;
   identifying, based on the second bitmap, whether the DL HARQ feedback condition of each DL HARQ process in the DL HARQ process set is related to a first DL HARQ feedback condition or a second DL HARQ feedback condition;
   receiving, from the BS, a Radio Resource Control (RRC) Information Element (IE) including a logical channel configuration for a logical channel, the logical channel configuration including a parameter that indicates at least one of the first HARQ mode and the second HARQ mode is allowed to be mapped to the logical channel;
   receiving, from the BS, a UL grant including a HARQ process identifier that indicates a UL HARQ process in the UL HARQ process set;
   performing, based on a Logical Channel Prioritization (LCP) procedure, a transmission for the UL HARQ process via the UL grant; and
   determining, based on the parameter and the HARQ mode of the UL HARQ process, whether the logical channel is allowed to be selected for the transmission.

2. The method of claim 1, wherein:
   the first HARQ mode includes a HARQ Mode A,
   the HARQ Mode A represents that UL HARQ retransmission is enabled,
   the second HARQ mode includes a HARQ Mode B, and
   the HARQ Mode B represents that the UL HARQ retransmission is disabled.

3. The method of claim 1, wherein the first configuration is included in a Physical Uplink Shared Channel (PUSCH) configuration for the serving cell.

4. The method of claim 1, further comprising:
   setting a value of the HARQ RTT timer for the UL HARQ process in a case that the HARQ mode of the UL HARQ process is related to the first HARQ mode, wherein:
   the value is a sum of a first value and a second value,
   the first value is configured by a Discontinuous Reception (DRX) configuration received from the BS,
   the second value corresponds to an RTT, and
   the RTT is derived by a Timing Advance (TA) value and a scheduling offset.

5. The method of claim 1, further comprising:
   identifying, based on a bit in the first bitmap, that the HARQ mode of the UL HARQ process is related to the first HARQ mode in a case that the bit indicates a first value; and
   identifying, based on the bit in the first bitmap, that the HARQ mode of the UL HARQ process is related to the second HARQ mode in a case that the bit indicates a second value.

6. The method of claim 1, wherein:

the first DL HARQ feedback condition represents that DL HARQ feedback is enabled, and the second DL HARQ feedback condition represents that the DL HARQ feedback is disabled.

7. The method of claim 1, wherein the second configuration is included in a Physical Downlink Shared Channel (PDSCH) configuration for the serving cell.

8. A User Equipment (UE) for performing a Hybrid Automatic Repeat Request (HARQ) mode operation in a non-terrestrial network (NTN), the UE comprising:

at least one non-transitory computer-readable medium storing one or more computer-executable instructions; and at least one processor coupled to the at least one non-transitory computer-readable medium and configured to execute the one or more computer-executable instructions to cause the UE to:

receive, from a Base Station (BS), a first configuration and a second configuration for a serving cell, the first configuration including a first bitmap for indicating a HARQ mode of each uplink (UL) HARQ process in a UL HARQ process set, each bit in the first bitmap being associated with a corresponding UL HARQ process in the UL HARQ process set, and the second configuration including a second bitmap for indicating a Downlink (DL) HARQ feedback condition of each DL HARQ process in a DL HARQ process set, each bit in the second bitmap being associated with a corresponding DL HARQ process in the DL HARQ process set;

identify, based on the first bitmap, whether the HARQ mode of each UL HARQ process in the UL HARQ process set is related to a first HARQ mode, in which a HARQ Round Trip Time (RTT) timer for the UL HARQ process is set and started by the UE, or a second HARQ mode, in which the HARQ RTT timer for the UL HARQ process is not started by the UE;

identify, based on the second bitmap, whether the DL HARQ feedback condition of each DL HARQ process in the DL HARQ process set is related to a first DL HARQ feedback condition or a second DL HARQ feedback condition;

receive, from the BS, a Radio Resource Control (RRC) Information Element (IE) including a logical channel configuration for a logical channel, the logical channel configuration including a parameter that indicates at least one of the first HARQ mode and the second HARQ mode is allowed to be mapped to the logical channel;

receive, from the BS, a UL grant including a HARQ process identifier that indicates a UL HARQ process in the UL HARQ process set;

perform, based on a Logical Channel Prioritization (LCP) procedure, a transmission for the UL HARQ process via the UL grant; and determine, based on the parameter and the HARQ mode of the UL HARQ process, whether the logical channel is allowed to be selected for the transmission.

9. The UE of claim 8, wherein:

the first HARQ mode includes a HARQ Mode A, the HARQ Mode A represents that UL HARQ retransmission is enabled, the second HARQ mode includes a HARQ Mode B, and the HARQ Mode B represents that the UL HARQ retransmission is disabled.

10. The UE of claim 8, wherein the first configuration is included in a Physical Uplink Shared Channel (PUSCH) configuration for the serving cell.

11. The UE of claim 8, wherein the at least one processor is further configured to execute the one or more computer-executable instructions to cause the UE to:

set a value of the HARQ RTT timer for the UL HARQ process in a case that the HARQ mode of the UL HARQ process is related to the first HARQ mode, wherein:

the value is a sum of a first value and a second value, the first value is configured by a Discontinuous Reception (DRX) configuration received from the BS, the second value corresponds to an RTT, and the RTT is derived by a Timing Advance (TA) value and a scheduling offset.

12. The UE of claim 8, wherein the at least one processor is further configured to execute the one or more computer-executable instructions to cause the UE to:

identify, based on a bit in the first bitmap, that the HARQ mode of UL HARQ process is related to the first HARQ mode in a case that the bit indicates a first value; and identify, based on the bit in the first bitmap, that the HARQ mode of the UL HARQ process is related to the second HARQ mode in a case that the bit indicates a second value.

13. The UE of claim 8, wherein:

the first DL HARQ feedback condition represents that DL HARQ feedback is enabled, and the second DL HARQ feedback condition represents that the DL HARQ feedback is disabled.

14. The UE of claim 8, wherein the second configuration is included in a Physical Downlink Shared Channel (PDSCH) configuration for the serving cell.

* * * * *